(12) United States Patent
Guzmán Suarez et al.

(10) Patent No.: US 9,275,475 B2
(45) Date of Patent: Mar. 1, 2016

(54) GENERATING A SIMULATED THREE DIMENSIONAL SCENE BY PRODUCING REFLECTIONS IN A TWO DIMENSIONAL SCENE

(75) Inventors: Angela Guzmán Suarez, San Jose, CA (US); Alexandre Carlhian, Puteaux (FR); Cédric Bray, Vincennes (FR); Chanaka Karunamuni, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 952 days.

(21) Appl. No.: 13/480,464

(22) Filed: May 24, 2012

(65) Prior Publication Data

US 2012/0307005 A1 Dec. 6, 2012

Related U.S. Application Data

(60) Provisional application No. 61/493,411, filed on Jun. 3, 2011, provisional application No. 61/493,408, filed on Jun. 3, 2011.

(51) Int. Cl.
*H04N 13/00* (2006.01)
*G06T 11/00* (2006.01)
*G06T 3/60* (2006.01)

(52) U.S. Cl.
CPC .. *G06T 11/00* (2013.01); *G06T 3/60* (2013.01)

(58) Field of Classification Search
CPC ...... G06F 3/04815; G09G 3/003; G09G 5/14; G09G 3/00; H04N 21/4438; H04N 7/15; G06T 13/20; G06T 13/80; G06T 11/00; G06T 15/00

USPC ..................................................... 348/42–60
See application file for complete search history.

(56) References Cited

U.S. PATENT DOCUMENTS

| 5,831,620 A | 11/1998 | Kichury, Jr. |
| 7,764,286 B1 | 7/2010 | Kumar |
| 7,889,913 B2 | 2/2011 | Wells |

(Continued)

FOREIGN PATENT DOCUMENTS

WO        00/64144 A1    10/2000

OTHER PUBLICATIONS

International Preliminary Report on Patentability, dated Dec. 19, 2013, from corresponding International Patent Application No. PCT/US2012/040594, filed Jun. 1, 2012.

*Primary Examiner* — Sath V Perungavoor
*Assistant Examiner* — Nathnael Aynalem
(74) *Attorney, Agent, or Firm* — Kenyon & Kenyon LLP

(57) ABSTRACT

A method that simulates a three dimensional scene by producing reflections in a two dimensional scene. In some embodiments, the two dimensional scene includes a display area for displaying a set of images, and at least one object that is displayed near the display area. The method generates reflections of the set of images on the object and superimposes the generated reflections on the display of the object. In some embodiments, the method generates and displays the reflections in real-time as it displays the set of images in order to cause the display of the set of images to appear to be part of a 3D environment. In some embodiments, the set of images are part of a video that a device displays in real-time. The device generates reflections off one or more neighboring objects from the content displayed in each video frame.

34 Claims, 12 Drawing Sheets

(56) References Cited

U.S. PATENT DOCUMENTS

| | | |
|---|---|---|
| 2002/0030692 A1 | 3/2002 | Griesert |
| 2008/0002160 A1* | 1/2008 | Chang et al. ............... 353/94 |
| 2009/0251460 A1 | 10/2009 | Dunnigan |
| 2010/0002073 A1* | 1/2010 | Robinson et al. ............ 348/42 |
| 2010/0013959 A1 | 1/2010 | Rai |
| 2010/0079449 A1 | 4/2010 | McCarthy |
| 2011/0025825 A1 | 2/2011 | McNamer et al. |
| 2011/0052140 A1* | 3/2011 | Mori et al. .................. 386/224 |
| 2011/0078591 A1* | 3/2011 | van Os et al. ................ 715/756 |

* cited by examiner

GENERATING A SIMULATED THREE DIMENSIONAL SCENE BY PRODUCING REFLECTIONS IN A TWO DIMENSIONAL SCENE

CLAIM OF BENEFIT TO PRIOR APPLICATIONS

This application claims the benefit of U.S. Provisional Patent Application 61/493,411, entitled "Generating a Simulated Three Dimensional Scene by Producing Reflections in a Two Dimensional Scene," filed Jun. 3, 2011. This application also claims the benefit of U.S. Provisional Patent Application 61/493,408, entitled "Generating a Simulated Three Dimensional Scene by Producing Reflections in a Two Dimensional Scene," filed Jun. 3, 2011. The contents of U.S. Provisional Patent Applications 61/493,411 and 61/493,408 are incorporated herein by reference.

BACKGROUND

To date, there have been a number of approaches to make two-dimensional animations that are displayed on a device appear three-dimensional. These approaches typically involve performing perspective transformations to provide the appearance of depth (i.e., the perception of a third dimension) in a two-dimensional scene. At times, these approaches also include performing lighting operations that generate reflections in a two-dimensional scene from a virtual light source in the scene. However, these approaches limit their operations to displayed or animated objects that are defined in the scene. As such, the presentation on the device is not tied to the environment in which the device operates.

SUMMARY

Some embodiments of the invention provide a method that simulates a three dimensional scene by producing reflections in a two dimensional scene. In some embodiments, the two dimensional scene includes (1) a display area for displaying a set of images (such as a video presentation, slide show, etc.), and (2) at least one object that is displayed near the display area. To simulate the three dimensional scene, the method generates reflections of the set of images on the object and superimposes the generated reflections on the display of the object.

In some embodiments, the method generates and displays the reflections in real-time as it displays the set of images in order to cause the display of the set of images to appear to be part of a 3D environment. For instance, in some embodiments, the set of images are part of a video that a device displays in real-time. In these embodiments, the device generates reflections off one or more neighboring objects from the content displayed in each video frame or each of several video frames in the display area. These reflections, in turn, cause the real-time display of the video to appear as if it is part of a 3D presentation.

One application that uses the method of some embodiments to generate reflections in real-time is an image capturing application. In some embodiments, an image capturing application of a device displays a photo booth and displays on a display area within this booth a video clip that is captured by a camera of the device. Near the display area, the application displays several objects that form the photo booth. On one or more of these objects, the application displays reflections from the content of each video picture or each of several video pictures, in order to render the photo booth a 3D appearance to a viewer of the application.

To project reflections onto a nearby object from an image (such as a video frame), the method of some embodiments generates a reflection from the content of a portion of the image that the method associates with the nearby object (e.g., is in a portion of the image close to the nearby object). The method generates this reflection in some embodiments by (1) producing a lower resolution version of the image content in that portion, and (2) superimposing this lower resolution version onto the nearby object.

Different embodiments use different operations to generate this lower resolution image. These operations in some embodiments include (1) sampling some or all of the pixels of the image portion associated with the nearby object, (2) blurring the component color values of the sampled pixels (e.g., reducing variations in the component color values by using an averaging process that replaces each pixel's component color values with a weighted average of the component color values of neighboring pixels), (3) masking the sampled, blurred component color values, and (4) reflecting (i.e., flipping) the sampled, blurred, and masked component color values about a first axis (e.g., about the y-axis) that is defined between the image and the nearby object and along a second axis that is perpendicular to the first axis (e.g., along the x-axis). In other embodiments, the method employs these operations in a different order, does not employ all these operations, or employs other operations in conjunction with these operations or with different ordering or combinations of these operations.

The method of some embodiments does not use a virtual light source to generate a shadow effect by projecting reflections of the image on the nearby object. In some such embodiments, every object in the reflected lower resolution image represents an object in the original image irrespective of any source of light in the display area. In other words, to create a 3D presentation, the method of these embodiments does not generate shadows of tangible objects onto the nearby objects even though a source of light exists in the original image.

In some embodiments, the method reflects (i.e., flips) the sampled, blurred, and masked image in order to produce a more realistic, mirrored reflection, which simulates how a reflection between two neighboring objects appears in the real world. To perform this flip, the method uses a scaling transform with a negative scale factor that is −1 or that falls within the range [0 to −1].

The method of some embodiments particularly defines the sampling, blurring, and masking operations to define particularly the resolution of the reflected image that is to be superimposed on the nearby object. Increasing the number of samples or reducing the degree of the blurring and/or masking improves the level of detail of the reflected image. On the other hand, decreasing the number of samples or increasing the degree of blurring and/or masking reduces the level of detail of the reflected image.

The method of some embodiments particularly defines the resolution of the reflected image for a nearby object (by particularly defining the sampling, blurring and masking operations) in order to achieve one or more objectives. One objective is to produce a reflection that matches the supposed reflective nature of the nearby object. The more reflective the nearby object, the more the method increases the amount of samples, and/or reduces the blurring and/or masking in order to improve the level of detail of the reflected image. In other words, the method increases the number of samples, and/or reduces the blurring and/or masking when the nearby object is supposedly a highly reflective object, while it reduces the number of samples and/or increases the blurring and/or masking when the nearby object is supposedly a dull, non-reflecting object.

Another objective is to produce reflections in real-time without unnecessarily consuming the computing resources of the device. For some applications of the method, it is not necessary to produce exact reflections, since the reflections are there to only provide a sensation of a 3D environment. Accordingly, in some embodiments, the method uses faster techniques to produce less refined reflections, because the 3D sensation is often achievable by providing an amount of reflections that is less than an exact replication of the reflections.

The method of some embodiments is used by a device with only one display screen that displays the output of the device, including the set of images, the neighboring objects and the reflections on the neighboring objects. In other embodiments, however, the device has and/or uses more than one display screen. For instance, the device in some embodiments is a computer that has or connects to multiple display devices. In such embodiments, the method can display the set of images, the neighboring objects and the reflections on the neighboring objects on one display device, or it can allow the set of images to be displayed on one display device while displaying the neighboring objects and the reflections off the neighboring objects on one or more other display devices.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details.

Some embodiments of the invention provide a method that simulates a three dimensional scene by producing reflections in a two dimensional scene. In some embodiments, the two dimensional scene includes (1) a display area for displaying a set of images (such as a video presentation, slide show, etc.), and (2) at least one object that is displayed near the display area. To simulate the three dimensional scene, the method generates virtual reflections of the set of images on the object and superimposes the generated virtual reflections on the display of the object.

In some embodiments, the method generates and displays the reflections in real-time as it displays the set of images in order to cause the display of the set of images to appear to be part of a 3D environment. For instance, in some embodiments, the set of images are part of a video that a device captures and displays in real-time. In these embodiments, the device generates virtual reflections off one or more neighboring objects from the content displayed in each video frame or each of several video frames. These virtual reflections, in turn, cause the real-time display of the video to appear as if it is part of a 3D presentation.

Figure 1:
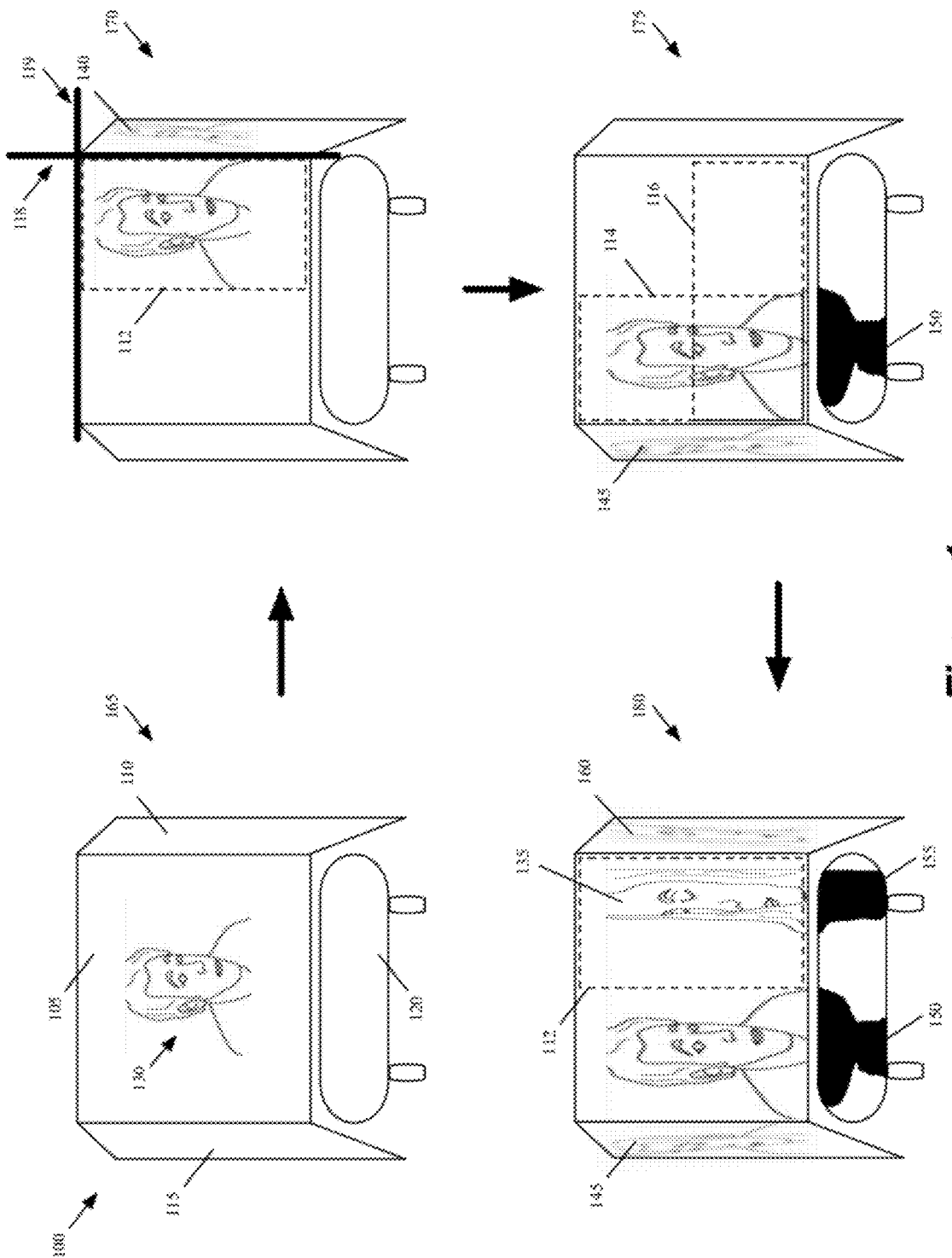
FIG. 1 illustrates an example of generating real-time reflections in a video conferencing application.

FIG. 1 illustrates an example of a video conferencing application that uses the method of some embodiments to generate real-time reflections for video content. This application executes on a device (e.g., a desktop computer, a laptop computer, a tablet computer, a multi-function mobile device, a set-top box, etc.) to establish a video conference between the user of the device and one or more users of one or more other devices. The application generates real-time reflections from the content of the video presentation that it displays in order to simulate a 3D meeting room environment for the user of its device.

In some embodiments, the video conferencing application has a graphical user interface (GUI) 100 that includes a display area 105 and three nearby graphical objects, which are two walls 110 and 115 and a desk 120. During the video conference, the application displays the video from one or more of the users in the display area 105. In some embodiments, one of the displayed videos is the video of the user of the device on which the application executes. This video is captured in some embodiments by the camera of the device.

Near the display area 105, the video conferencing application displays the walls 110 and 115 and the table 120 that form a virtual conference room for the conference. On one or more of these objects, the application displays reflections from the content of each video frame or each of several video frames, in order to give the virtual conference room a 3D appearance to the viewer of the application. To project reflections from content of a video frame onto a nearby object, the video conferencing application of some embodiments generates a reflection from the content of a portion of the frame that is close to the nearby object.

FIG. 1 illustrates examples of such reflections on the nearby objects by presenting four stages 165-180 during a video conference. In the first stage 165, the application displays a video frame from the video conference. In this video frame, one of the participants 130 of the video conference is shown in the center of the display area 105, too far from each of the nearby objects 110, 115, and 120 to cast a reflection on any of them. The display area 105 does not display any other content in any of the video frames that are shown in the first stage 165 or any of the other stages 170-180. This lack of other content is a simplification that is made in this example, as the video feed of a participant typically includes content from the environment surrounding the participant. But this simplification is made in this example in order to simplify the description of this example.

The second stage 170 illustrates a second video frame, in which the participant 130 has moved closer to the right edge of the video frame. With the participant's image closer to the right wall 110, the video conferencing application generates a reflection 140 of the participant onto the right wall 110. In some embodiments, the application generates this reflection by (1) producing a lower resolution version of the video frame content in a portion 112 of the video frame that it associates with the right wall 110, and (2) superimposing this lower resolution version onto the right wall 110.

Different embodiments use different operations to generate this lower resolution frame. These operations in some embodiments include (1) sampling some or all of the pixels of the video frame (e.g., selecting a subset of the pixels in the image portion 112 associated with the right wall 110), (2) blurring the component color values of the sampled pixels (e.g., reducing variations in the component color values by using an averaging process that replaces each pixel's component color values with a weighted average of the component color values of neighboring pixels), (3) masking the sampled, blurred component color values, and (4) flipping the sampled, blurred, and masked component color values about a y-axis 118 that is defined between the frame and the wall 110, and (5) moving the flipped values along an x-axis 119 that is perpendicular to the y-axis until the values are positioned on the wall 110. In other embodiments, the application employs these operations in a different order, does not employ all these operations, or employs other operations in conjunction with these operations or with different ordering or combinations of these operations.

In some embodiments, the video conferencing application flips the sampled, blurred, and masked image in order to produce a more realistic, mirrored reflection, which simulates how a reflection between two neighboring objects appears in the real world. To perform this flip, the method uses a scaling transform with a negative scale factor that is −1 or that falls within the range [0 to −1]. A scaling factor that is between 0 and −1 (e.g., −0.5) reduces the size of the reflected image compared to the size of the corresponding video picture content. This reduction in size assists in the perception of the reflection as it simulates the smaller size of the reflection when the right wall is at an angle to the display area.

In addition to applying the scaling transform, the application in some embodiments also applies a shearing transform to distort the shape of the reflected image to represent the angle between the right sidewall and the display area. Alternatively, to perform the flip, the application in some embodiments uses a two-dimensional affine transform that involves some combination of flipping, scaling, and distortion transforms. However, it should be noted that the application of some embodiments forgoes performing computationally intensive transforms that produce exact reflected images, because such transforms consume a lot of computation resources and such exact reflected images are often not needed to provide the 3D sensation in many applications.

Also, the application in some embodiments particularly defines the sampling, blurring, and masking operations to define particularly the resolution of the reflected image that is to be superimposed on the nearby object. Increasing the number of samples or reducing the degree of the blurring and/or masking improves the level of detail of the reflected image. On the other hand, decreasing the number of samples or increasing the degree of blurring and/or masking reduces the level of detail of the reflected image.

The video conferencing application in some embodiments particularly defines the resolution of the reflected image for a nearby object (by particularly defining the sampling, blurring and masking operations) in order to produce a reflection that matches the supposed reflective nature of the nearby object, and to produce reflections in real-time without unnecessarily consuming the computing resources of the device.

The third stage 175 of FIG. 1 presents an example of the video conferencing application modifying the resolution of the reflected images to match the reflective properties of the nearby objects. Specifically, it illustrates a third video frame, in which the participant 130 has moved closer to the lower left edge of the video frame. At this position, the participant's image is closer to the left wall 115 and the table 120. For this position, the video conferencing application generates a reflection 145 of the participant onto the left wall 115 and a reflection 150 onto the table 120. The application generates each reflection in some embodiments by (1) producing a lower resolution version of the video frame content in a portion 114 or 116 of the video frame that it associates with the left wall 115 or the table 120, and (2) superimposing each lower resolution version onto its corresponding nearby object (i.e., the left wall and the table).

In this example, it is assumed that the right and left walls 110 and 115 have better reflective properties than the table 120. To account for the differing reflective properties of the left wall and the table, the application produces a lower resolution version of the participant for projecting onto the table 120 than it produces of the participant for projecting onto the left wall 115. In other words, the reflected image 145 on the left wall 115 has a higher resolution than the reflected image 150 on the table 120, because the left wall is supposed to be more reflective than the table 120. To differentiate the resolution of the reflected images, the application of some embodiments adjusts its sampling, blurring and/or masking operations. For instance, to produce the higher resolution reflections 140 and 145 on the right and left walls 110 and 115, the application of some such embodiments increases the number of samples or reduces the degree of the blurring and masking. On the other hand, to produce the lower resolution reflection 150 on the table 120, the application decreases the number of samples or increases the degree of blurring and/or masking The fourth stage 180 illustrates another example of the video conferencing application modifying the resolution of the reflected images to match the reflective properties of the nearby objects. Specifically, it illustrates a fourth video frame, in which a new participant 135 is shown in the right side of the video frame next to the image of the participant 130 on the left side of the frame. The new participant might be using the same video conferencing device as the participant 130, or might be participating in the video conference by using another device. For the new participant 135, the video conferencing application generates a reflection 160 on the right wall 110 and a reflection 155 on the table 120. As with the reflections 145 and 150, the application generates the wall reflection 160 to have a higher resolution than the table reflection 155 in order to convey that the wall 110 is more reflective than the table 120.

As mentioned above, the video conferencing application in some embodiments particularly specifies the sampling, blurring, and masking parameters to particularly define the resolution of a reflected image for a nearby object to represent the supposed reflective nature of a nearby object. In these or other embodiments, the video conferencing application also particularly specifies these parameters to particularly define the resolution of the reflected image for the nearby object in order to produce reflections in real-time without unnecessarily consuming the computing resources of the device. In some embodiments, the video conferencing application does not necessarily have to produce exact reflections, since the reflections are there to only provide a sensation of a 3D environment. These embodiments thus can use faster techniques for producing reflections, as these reflections do not have to be exact reflections.

Also, as mentioned before, the method of some embodiments does not use a virtual light source to generate a shadow effect by projecting reflection of the image on the nearby object. In some such embodiments, every object in the generated, reflected image is generated as a lower resolution image (e.g., as a sampled, blurred, masked, and flipped image) of another object in original image without reference to any virtual light source.

In the example illustrated in FIG. 1, the video conferencing application displays its GUI 100 on one display device. Accordingly, in this example, the display area 105 for displaying the video content, and the nearby graphical objects 110, 115, and 120 for reflecting the video content, are all shown on one display device. However, one of ordinary skill in the art will realize that when the video conferencing application executes on a device with more than one display screen (e.g., executes on a computer that has (and/or uses) more than one display screen), the video conferencing application can allow the video content to be displayed on one display screen while displaying the neighboring objects and the reflections off the neighboring objects on one or more other display screens.

Several more detailed embodiments will be described below. Section I describes a process that some embodiments use to generate real-time a reflection of an image onto an object that is displayed near the image to make the image appear as if it is part of a 3D environment. Section II then describes a system that generates such a reflection. Next, Section III describes an image capturing application that uses the system described in Section II to generate reflections. Finally, Section IV describes an electronic system that utilizes the reflection generating processes and/or systems of some embodiments to generate real-time reflections of one or more images on one or more nearby objects.

I. Reflection Generating Process

Figure 2:
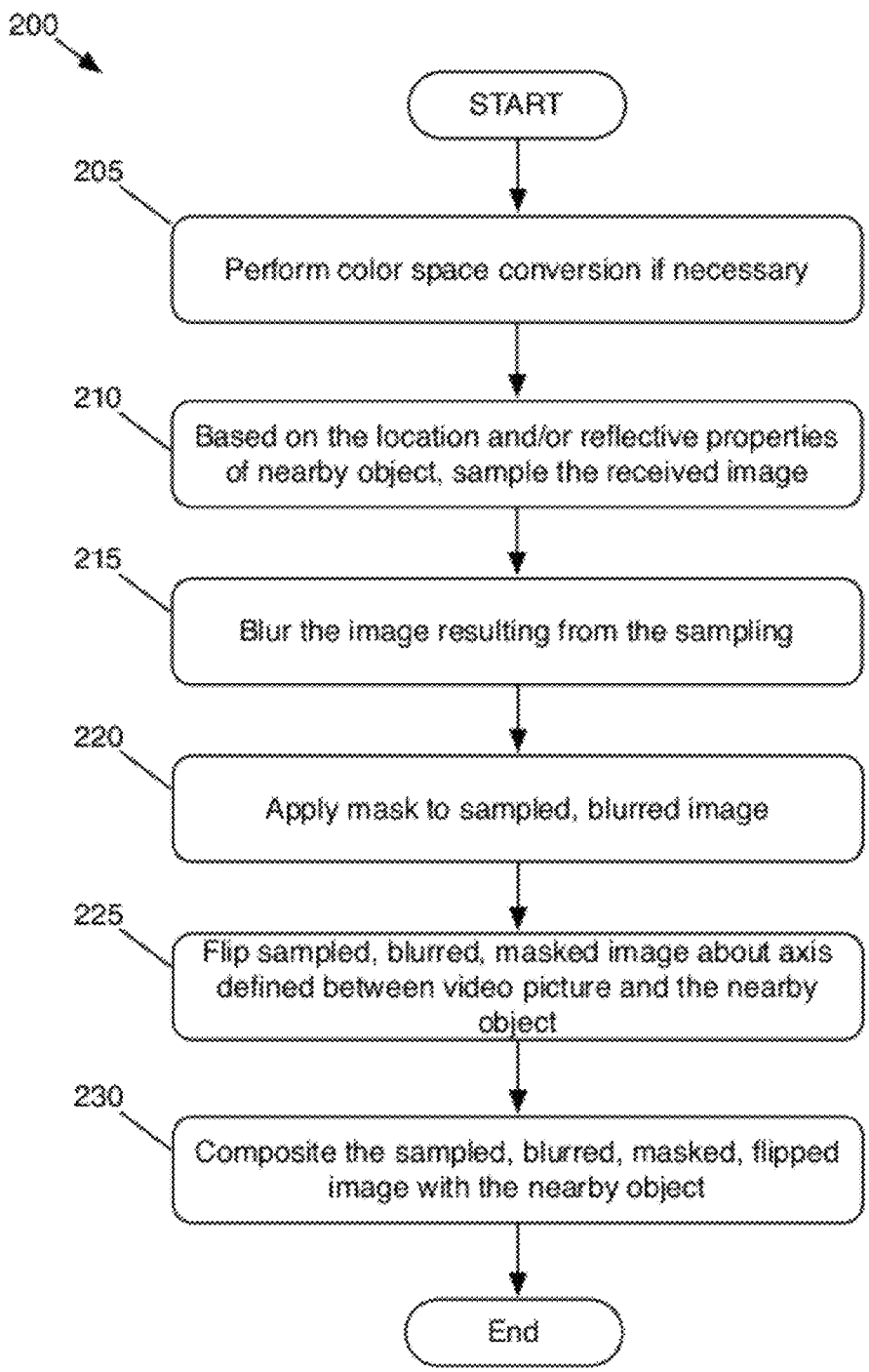
FIG. 2 conceptually illustrates a process of some embodiments for generating a real-time reflection onto nearby objects.

FIG. 2 conceptually illustrates a process 200 that generates in real-time a reflection of an image onto an object that is displayed near the image to make the image appear as if it is part of a 3D environment. When the image is displayed next to multiple objects, some embodiments perform this process multiple times, with each iteration generating a reflection of the image for another nearby object. Some embodiments perform this process in parallel for multiple objects that are to be displayed near the image, while other embodiments perform this process serially for each nearby object.

Also, some embodiments perform multiple iterations of the process 200 for multiple nearby objects each time a new image is received for display. For instance, one application that uses the process 200 in some embodiments is an image capturing application of a device. In some embodiments, the image capturing application displays a photo booth and displays within a display area of this booth a video clip that is captured by a camera of the device. Near the display area, the application displays several objects that form the photo booth.

On one or more of these objects, the application displays reflections from the content of each video picture or each of several video pictures, in order to give the photo booth a 3D appearance to a viewer of the application.

In some such embodiments, the received image is a video picture (e.g., video frame or field) that is captured by the device's camera. While preparing the display of each new video picture on the device's display screen, the image capturing application of some of these embodiments performs the process 200 multiple times for the received video picture. By performing the process multiple times, the application generates in real-time multiple reflections on multiple nearby objects that are to be displayed with the video picture. In other embodiments, the application uses a variation of the process 200 that computes all the reflections for all reflecting nearby objects together. Also, in other embodiments, the process 200 is used by other applications (e.g., video conferencing applications) to generate reflections for video pictures or other images that the device (on which the process 200 executes) receives through a network.

In some embodiments, the process 200 starts when it receives an image based on which it needs to generate a reflection on a nearby object. This nearby object is referred to as the reflective object. Initially, the process 200 performs (at 205) a color space conversion on the received image if it needs to modify the color format of the image for one of its image processing operations (e.g., converts a received video frame from a YCbCr format to an RGB format). Specifically, in some cases, the received image has a color format that differs from a color format that the process 200 uses to perform one or more of its image processing operations. For instance, in some embodiments, the process receives a video frame in a YCbCr format, which differs from an RGB format that it uses for compositing several layers of the final display. For such embodiments, the process 200 performs (at 205) color space conversion to convert the received image from its received format into a desired format for one or more of its image processing operations. One of ordinary skill in the art will realize that while FIG. 2 illustrates the process 200 performing the color space conversion operation as its first operation 205, the process 200 performs this operation after some of its other operations in other embodiments.

After 205, the process 200 performs a series of operations that are intended to generate and project a reflection onto the reflective object that is near the video picture. These operations first produce a lower resolution version of the image content in a portion of the video picture associated with the reflective object, and then superimpose this lower resolution version onto the reflective object. Specifically, after 205, the process 200 performs (at 210) a sampling operation that selects a subset of the pixels in a portion of video picture that the process associates with the reflective object for which it is generating the reflection. The sampling operation defines a new sampled image based on the selected subset of pixels. In some embodiments, each pixel in the sampled image has the same component color values as it had in the original video picture.

In some embodiments, the sampling operation selects the subset of pixels by averaging pixels that neighbor each other by a factor of n, where n is an integer such as 4, 8, 12, 16, 20, 24, etc., and assigning the averaged pixel color component value to a pixel in the sample pixel. Other embodiments select the subset of pixels by selecting one pixel out of every group of n neighboring pixels as the pixel to add to the sampled image.

The sampling operation in some embodiments bases the number of samples that it takes on the supposed reflective property of the reflective object. This operation takes more samples of the video picture portion when the reflective object is supposedly more reflective, than it would take when the reflective object is supposedly less reflective. Also, in some embodiments, the number of samples taken by the sampling operation is particularly or controllably specified in order to particularly or controllably adjust the process' use of the computational resources of the device. In other words, the amount of computational resources that are devoted to the generation of reflections can be adjusted by adjusting the degree of sampling.

At 215, the process performs a blurring operation on the output of the sampling operation, which as mentioned above is referred to as the sampled image. The sampled image is a sub-sampled, lower resolution version of the video picture content in the video picture portion associated with the reflective object. The blurring operation in some embodiments further reduces the level of detail of the sampled image. In some embodiments, the blurring operation reduces variations in the component color values of the pixels in the sampled image by using an averaging system that replaces each pixel's component color values with a weighted average or other blended value of the component color values of neighboring pixels. The blurring operation of some embodiments uses a blurring kernel that specifies a window size for performing an averaging or blurring operation on the sampled image. Also, some embodiments perform the blurring only in one direction (i.e., for a particular pixel, use pixels on only one side of the particular pixel to perform the averaging or blurring operation). These embodiments apply the blurring kernel to a smaller version (e.g., a lower resolution version) of the sampled image, which is then enlarged after the application of the blurring kernel.

In some embodiments, the blurring operation defines its blurring parameters, and thereby the degree of blurring it performs, on the supposed reflective property of the reflective object. For instance, in some embodiments, the size of the blurring kernel, and the factor by which the sampled image is reduced before applying the blurring kernel, are one or both parameters of the blurring operation that can be adjusted to reflect the supposed reflective property of the reflective object. Also, in some embodiments, the size of the blurring kernel, and the factor by which the sampled image is reduced before applying the blurring kernel, are particularly or controllably specified in order to particularly or controllably adjust the process' use of the computational resources of the device.

After 215, the process applies (at 220) a mask to the sampled, blurred image that is output by the blurring operation. In some embodiments, the masking operation 220 essentially identifies a conceptual mask pattern of pixels across the sampled, blurred image. It then eliminates or adjusts component color values of pixels that are on this pattern, in order to further reduce the level of detail of the sampled, blurred image. In some embodiments, the masking operation makes each pixel on the mask pattern transparent (e.g., by adjusting its alpha value). The masking operation 220 defines its masking parameters, and thereby the degree of masking it performs, on the supposed reflective property of the reflective object. For instance, in some embodiments, the masking operation's pattern (i.e., the mask pattern that the masking operation defines) eliminates or adjusts more pixel values when the reflective object is less reflective than the mask pattern that is used when the reflective objective is more reflective. Also, in some embodiments, the masking operation's mask pattern is particularly or controllably specified in order to particularly or controllably adjust the process' use of the computational resources of the device.

Next, at 225, the process flips the sampled, blurred, and masked image that is output by the masking operation 220. In some embodiments, the process flips this image about a first axis that is defined between the video picture and the reflective object and along a second axis that is perpendicular to the first axis, in order to produce a more realistic, mirrored reflection, which simulates how a reflection between two neighboring objects appears in the real world.

To perform this flip, the process in some embodiments uses a scaling transform with a negative scale factor that is −1 or that falls within the range [0 to −1]. A scaling factor that is between 0 and −1 (e.g., −0.5) reduces the size of the reflected image compared to the size of the corresponding video picture content. This reduction in size assists in the perception of the reflection as it simulates the smaller size of the reflection when the right wall is at an angle to the display area. In addition to applying the scaling transform, the application in some embodiments also applies a shearing transform to distort the shape of the reflected image to represent the angle between the right sidewall and the display area. Alternatively, to perform the flip, the process in some embodiments uses a two-dimensional affine transform that involves some combination of flipping, scaling, and distortion transforms. However, it should be noted that the process of some embodiments forgoes performing computationally intensive transforms that produce exact reflected images, because such transforms consume a lot of computation resources and such exact reflected images are often not needed to provide the 3D sensation in many applications.

The sampled, blurred, masked, and flipped image that results from the flipping operation 225 is the reflected image that the video picture supposedly reflects on the reflective object. Accordingly, at 230, the process 200 composites this reflected image with the reflective object, or specifies instructions for a lower-level drawing process to draw the reflected image on (i.e., superimposed over) the reflective object. In some embodiments, the compositing operation removes pixels that are "dark" in the reflected image before compositing the reflected image with the reflective object. This is done to prevent the reflected image from darkening the original reflective object or portions of this object beyond recognition. In some embodiments, the dark pixels that are removed are pixels that have color component values that fall within a range of color component values that define dark gray to black pixels.

While the process 200 has been described by reference to a particular sequence of operations, one of ordinary skill in the art will realize that other embodiments employ this process or variations of this process by arranging some of its operations in a different order, by eliminating some of its operations, or by employing other operations in conjunction with these operations. For instance, in the above description, the process 200 samples only a portion of the video picture that is associated with the nearby reflective object. However, in other embodiments, the process 200 generates the reflected image to project onto the reflective object by sampling the entire video picture, performing its blurring and masking operations on the sub-sampled image in its entirety, and then cropping the portion of the resulting sampled, blurred, masked image before or after its flipping.

II. Reflection Generating System

Figure 3:
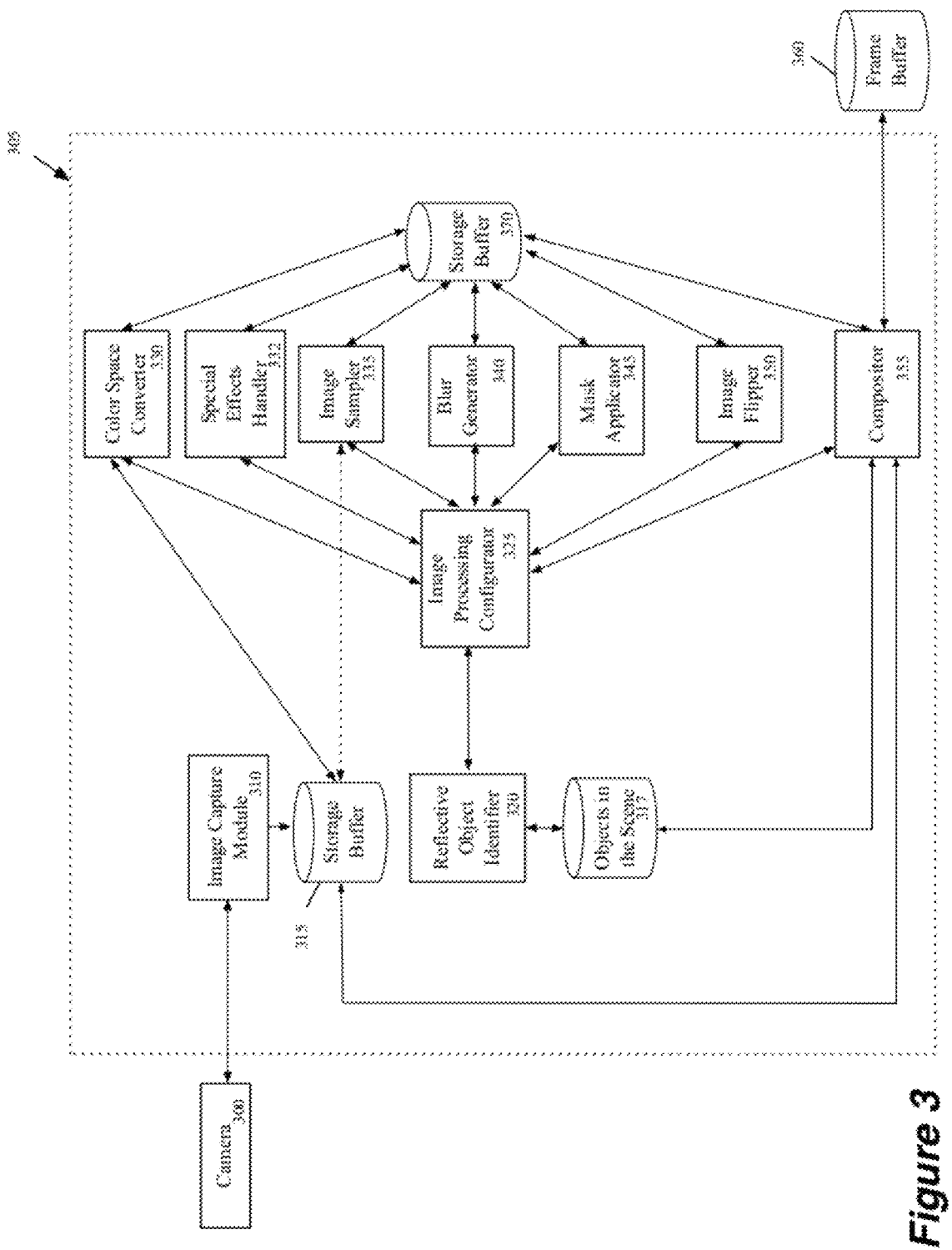
FIG. 3 illustrates an image processing system that displays real-time video pictures captured by a camera and generates real-time reflections.

FIG. 3 illustrates an image processing system 305 of a device of some embodiments of the invention. This system displays real-time video pictures (e.g., video frames) captured by a camera 300 of the device, and generates real-time reflections that are supposedly produced by the content of video pictures onto objects that the system displays near the displayed video pictures. The system 305 includes several modules that can repeatedly perform the process 200 serially or in parallel multiple times for multiple objects that are displayed near the displayed video pictures. In some embodiments, the system 305 is part of an image capturing application that displays a photo booth and displays, within a display area of this booth, a video clip that is captured by a camera of the device. Near the display area, the application displays several objects that form the photo booth. On one or more of these objects, the application displays reflections of the content of each video picture or each of several video pictures, in order to give the photo booth a 3D appearance to a viewer of the application. In other embodiments, the system 305 is used by other applications (e.g., video conferencing applications) to generate reflections for video pictures or other images that the device receives through a network.

As shown in FIG. 3, the image processing system 305 includes an image capture module 310, storage structures 315, 317, and 370, a reflective object identifier 320, an image processing configurator 325, a color space converter 330, a special effects handler 332, an image sampler 335, a blur generator 340, a mask applicator 345, an image flipper 350, and a compositor 355. In some embodiments, one or more of the modules 330, 332, 335, 340, 345, 350, and 355 are provided by the operating system (OS) of the device (e.g., by the OS framework).

The capture module 310 iteratively obtains video pictures captured by the device's camera 300 and stores each video picture in the storage buffer 315. In some embodiments, the camera 300 captures the video pictures in a YCbCr format and the capture module 310 stores these video pictures in this format.

As further described below, various modules of the system 305 retrieve the video pictures from the storage buffer 315 in order to generate the graphical display of the application that employs the image processing system 305. In some embodiments, the graphical display includes a display area that displays the captured video pictures, and one or more objects about the display area that are part of the graphical user interface of the application.

The image processing system treats one or more of these objects as being reflective objects. It stores descriptions of each object in the storage 317. It also uses the reflective object identifier 320 to identify the objects that have reflective properties, and to specify the positions of these objects with respect to the video display area (i.e., the display area for displaying video pictures), for the image processing configurator 325.

For each reflective object in the graphical display that the identifier 320 identifies for the image processing configurator 325, the configurator configures an image processing pipeline for producing the reflection on the reflective object from the content of each captured video frame. In some embodiments, each image processing pipeline has one instance of each image processing module 330-355, or each of several of these modules 330-355. Specifically, to define each image processing pipeline associated with a reflective object, the configurator 325 instantiates one instance of each of these modules 330-355, or one instance of each of several of these modules, and then directs these instantiated modules to generate the reflections for the reflective object. Accordingly, upon identifying the reflective objects for which the system needs to generate reflections, the image processing configurator 325 of some embodiments defines an appropriate number of image processing pipelines (to produce reflections for the reflective objects) by instantiating and calling an appropriate number of the modules 330-355.

In some embodiments, the image processing configurator 325 can define different image processing pipelines for different reflective objects based on different reflective properties of the different reflective objects or based on other considerations. Also, in some embodiments, the image processing configurator can define different image processing pipelines for the same reflective object under different conditions. For instance, as further described below, the image processing configurator defines a pipeline to include the special effects handler 332 when the video has to be shown with a special effect applied to it, while it foregoes including such a handler in the pipeline when no special effect has to be applied to the video. Inclusion of the special effects handler ensures that the system 305 generates the reflections to account for the special effects. Several examples of image processing pipelines will be described below by reference to FIGS. 4-7.

The image processing configurator 325 interacts with the modules 330-355 differently in different embodiments. In some embodiments, the instantiated modules of each pipeline directly interact with each other such that an earlier executing module informs a subsequently executing module that it has completed its operation and directs the subsequent executing module to begin processing the output of the earlier executing module. Other embodiments, however, have the configurator 325 act as a central image processor that coordinates operations between the different modules of the different image processing pipelines. In these embodiments, one or more of the modules notify the configurator whenever they complete their operations, so that the configurator can direct the next module in the pipeline to commence its operation.

Irrespective of whether the configurator 325 serves as a central image processor or simply configures and starts each image processing pipeline (by instantiating its modules and calling the first module), the configurator in some embodiments passes to one or more of the image processing modules 330-355 parameters that control their image processing operations. Examples of these parameters include the reflective property of a reflective object, the desired sampling, blurring, masking and/or flipping parameters, the location within the video pictures that is associated with each reflective object. Not all of these parameters are used in some embodiments. Also, some embodiments have the configurator 325 pass other parameters to the modules.

The color space converter 330 performs color space conversion on the video pictures when the system needs to modify the color format of the video pictures for one or more of its image processing operations. For instance, in some embodiments, the system 305 receives a video frame in a YCbCr format, which differs from an RGB format that it uses for compositing several layers of the final display. For such embodiments, the configurator 325 configures the color space converter to convert the video picture from its received format into a desired format for one or more of its image processing operations. The color space converter retrieves each video picture from the storage buffer 315 and stores the results of its color space conversion operation in the storage buffer 370. The storage buffer 370 is used by each of the modules 330-355 to retrieve the results of a previous image processing stage and to store the results of its image processing operation.

The special effects handler 332 applies one or more special effects to the captured video pictures before they are displayed when the video has to be shown with such special effects. In some embodiments, this handler also applies such effects to the copies of the captured video pictures that are used for generating the reflected images, applies such effects to the reflected images, or applies such effects to the earlier versions of the reflected images (where the earlier versions include the sampled image, the sampled and blurred image, or the sampled, blurred, and masked image). Performing the special effects in an image processing pipeline that generates a reflection ensures that the generated reflection accounts for the application of the special effects to the video picture. In other words, given that the generated reflections are supposedly the reflections of the video content onto nearby objects, the system 305 of some embodiments generates the reflections to account for the special effects to make the simulated reflections seem as if they are produced by the video content. Without accounting for the special effects, there might be a difference between the displayed video (which has the special effects) and the generated reflections (which would not account for the special effects).

The image sampler 335 performs a sampling operation that selects a subset of the pixels in a portion of the video picture that the sampler associates with the reflective object for which it is generating the reflection. When the color converter 330 and/or the special effects handler 332 process the video picture before the image sampler, the sampler samples the modified video pictures that are stored in the storage buffer 370 and that resulted from the color conversion and/or special effects application in some embodiments. Otherwise, in these embodiments, the sampler 335 samples the original video pictures stored in the storage buffer 315.

The sampling operation defines a new sampled image based on the selected subset of pixels. In some embodiments, each pixel in the sampled image has the same component color values in the sampled image as it had in the original or modified video picture. In some embodiments, the sampling operation selects the subset of pixels by averaging pixels that neighbor each other by a factor of n, where n is an integer such as 4, 8, 12, 16, 20, 24, etc., and assigning the averaged pixel color component value to a pixel in the sample pixel. Other embodiments select the subset of pixels by selecting one pixel out of every group of n neighboring pixels as the pixel to add to the sampled image.

Also, the sampling operation bases the number of samples that it takes on the supposed reflective property of the reflective object. This operation takes more samples of the video picture portion when the reflective object is supposedly more reflective, than it would take when the reflective object is supposedly less reflective. Also, in some embodiments, the number of samples taken by the sampling operation is particularly or controllably specified in order to particularly or controllably adjust the system's use of the computational resources of the device. In other words, the amount of computational resources that are devoted to the generation of reflections can be adjusted by adjusting the degree of sampling.

The blur generator 340 performs a blurring operation on the output of the sampler 335, which the sampler stores in the storage buffer 370. The sampled image is a sub-sampled, lower resolution version of the video picture content in the video picture portion associated with the reflective object. The blurring operation in some embodiments further reduces the level of detail of the sampled image. In some embodiments, the blurring operation reduces variations in the component color values of the pixels in the sampled image by using an averaging system that replaces each pixel's component color values with a weighted average or other blended value of the component color values of neighboring pixels. The blurring operation of some embodiments uses a blurring kernel that specifies a window size for performing an averaging or blurring operation on the sampled image. Also, some embodiments perform the blurring only in one direction (i.e., for a particular pixel, use pixels on only one side of the particular pixel to perform the averaging or blurring operation). Some embodiments apply the blurring kernel to a smaller version (e.g., a lower resolution version) of the sampled image, which is then enlarged after the application of the blurring kernel.

In some embodiments, the blurring operation defines its blurring parameters, and thereby the degree of blurring it performs, on the supposed reflective property of the reflective object. For instance, in some embodiments, the size of the blurring kernel, and the factor by which the sampled image is reduced before applying the blurring kernel, are one or both parameters of the blurring operation that can be adjusted to reflect the supposed reflective property of the reflective object. Also, in some embodiments, the size of the blurring kernel, and the factor by which the sampled image is reduced before applying the blurring kernel, are particularly or controllably specified in order to particularly or controllably adjust the system's use of the computational resources of the device.

The mask applicator 345 performs a masking operation to the sampled, blurred image that the blur generator 340 stores in the storage 370. In some embodiments, the masking operation essentially identifies a conceptual mask pattern of pixels across the sampled, blurred image. This operation eliminates or adjusts component color values of pixels that are on this pattern, in order to further reduce the level of detail of the sampled, blurred image. In some embodiments, the masking operation makes each pixel on the mask pattern transparent (e.g., by adjusting its alpha value). The masking operation defines its masking parameters, and thereby the degree of the masking it performs, on the supposed reflective property of the reflective object. For instance, in some embodiments, the masking operation's pattern (i.e., the mask pattern that the masking operation defines) eliminates or adjusts more pixel values when the reflective object is less reflective than the mask pattern that is used when the reflective objective is more reflective. Also, in some embodiments, the masking operation's mask pattern is particularly or controllably specified in order to particularly or controllably adjust the system's use of the computational resources of the device.

The image flipper 350 flips each sampled, blurred, and masked image that the mask applicator 345 stores in the storage 370. In some embodiments, this flipping is performed about a first axis that is defined between the video picture and the reflective object for which the flipper is generating the reflection and is along a second axis that is perpendicular to the first axis. This flipping produces a more realistic, mirrored reflection, which simulates how a reflection between two neighboring objects appears in the real world.

The sampled, blurred, masked, and flipped image that results from the flipping operation is the reflected image that a video picture supposedly reflects on a reflective object.

The compositor 355 retrieves the sampled, blurred, masked, and flipped image from the storage 370, and either composites this reflected image with the reflective object, or specifies instructions for a lower-level drawing system to draw the reflected image on (i.e., superimposed over) the reflective object. In some embodiments, the compositor removes pixels that are dark (e.g., removes pixels that are dark gray to black) in the reflected image before compositing the reflected image with the reflective object. This is done to prevent the reflected image from darkening the original reflective object or portions of this object beyond recognition. The compositor stores either the results of its compositing in a frame buffer 360 (as shown in FIG. 3), or sends the sampled, blurred, masked and flipped image along with drawing instructions to the lower-level drawing system to draw the reflected image on the reflective object.

The operation of the image processing system 305 will now be described by reference to FIGS. 4-6. These figures illustrate examples of image processing pipelines that the image processing configurator 325 can configure. The configurator 325 configures each of these pipelines by instantiating the image processing modules that are shown in these figures.

Figure 4:
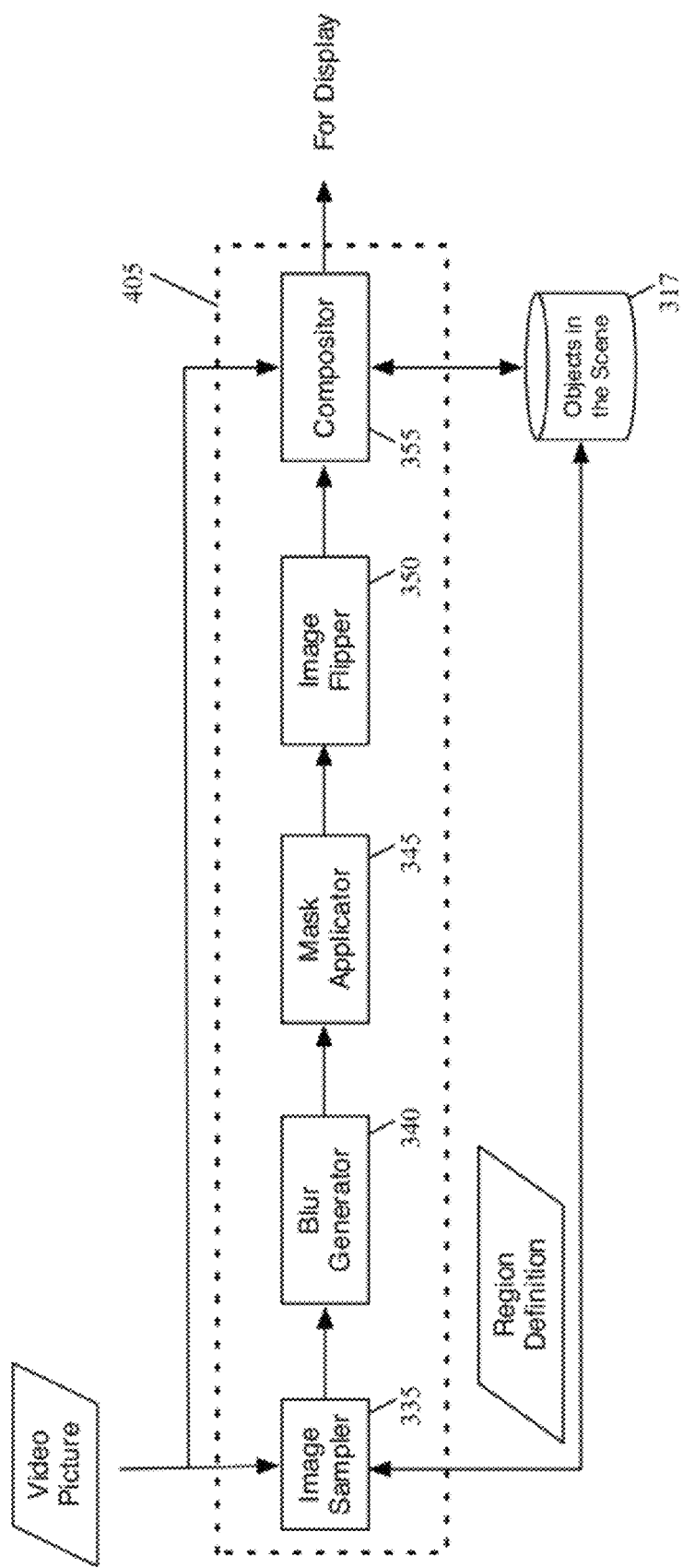
FIG. 4 illustrates a single image processing pipeline that the configurator of FIG. 3 defines to generate reflections onto nearby objects.

FIG. 4 illustrates a single image processing pipeline 405 that the configurator 325 defines to generate reflections onto a reflective object that is near a displayed video. This pipeline includes an image sampler 335, a blur generator 340, a mask applicator 345, an image flipper 350, and a compositor 355. Based on a set of attributes of the reflective object that is stored in the storage 317, these modules generate the reflections on the reflective object by respectively (1) sampling some or all of the pixels of the video picture portion associated with the nearby object, (2) blurring the component color values of the sampled pixels (3) masking the sampled, blurred component color values, (4) flipping the sampled, blurred, and masked component color values about an axis that is defined between the video picture and the reflective object, and (5) compositing or generating instructions to composite the generated flipped image with the reflective object.

As shown in FIG. 4, one attribute of the reflective object that the storage 317 stores in some embodiments is the region definition associated with the reflective object. The region definition defines the region in the video picture that is associated with the reflective object, or provides a set of indicia from which the image sampler can identify this region. Given this region definition, the image sampler can limit its image sampling operation to only the region of the video picture that is associated with the reflective object. Instead of relying on such region definition to limit its sampling, the image processing pipeline of some embodiments samples the entire image, and then uses this region definition to crop the reflected image or one of the intervening images that are produced from the intervening image processing operations, before compositing the reflected image with the reflective object.

Another set of attributes that the storage 317 stores are attributes that define the reflective properties of the object. As mentioned above, the image processing configurator of some embodiments particularly defines the sampling, blurring, and masking operations to define particularly the resolution of the reflected image that is to be superimposed on the reflective object. In some embodiments, the supposed reflective properties of the reflective object are used to specify the sampling, blurring and masking parameters that the image sampler 335, blur generator 340, and mask applicator 345 used to generate the reflected image. Accordingly, adjusting the reflective property of the reflective object adjusts the sampling, blurring and/or masking operations and thereby adjusts the resolution of the reflected image. Yet another attribute of the reflective object in the storage 317 is the axis that is defined between the video picture and the reflective object. This axis is used by the image flipper 350 to flip the sampled, blurred and masked image.

Figure 5:
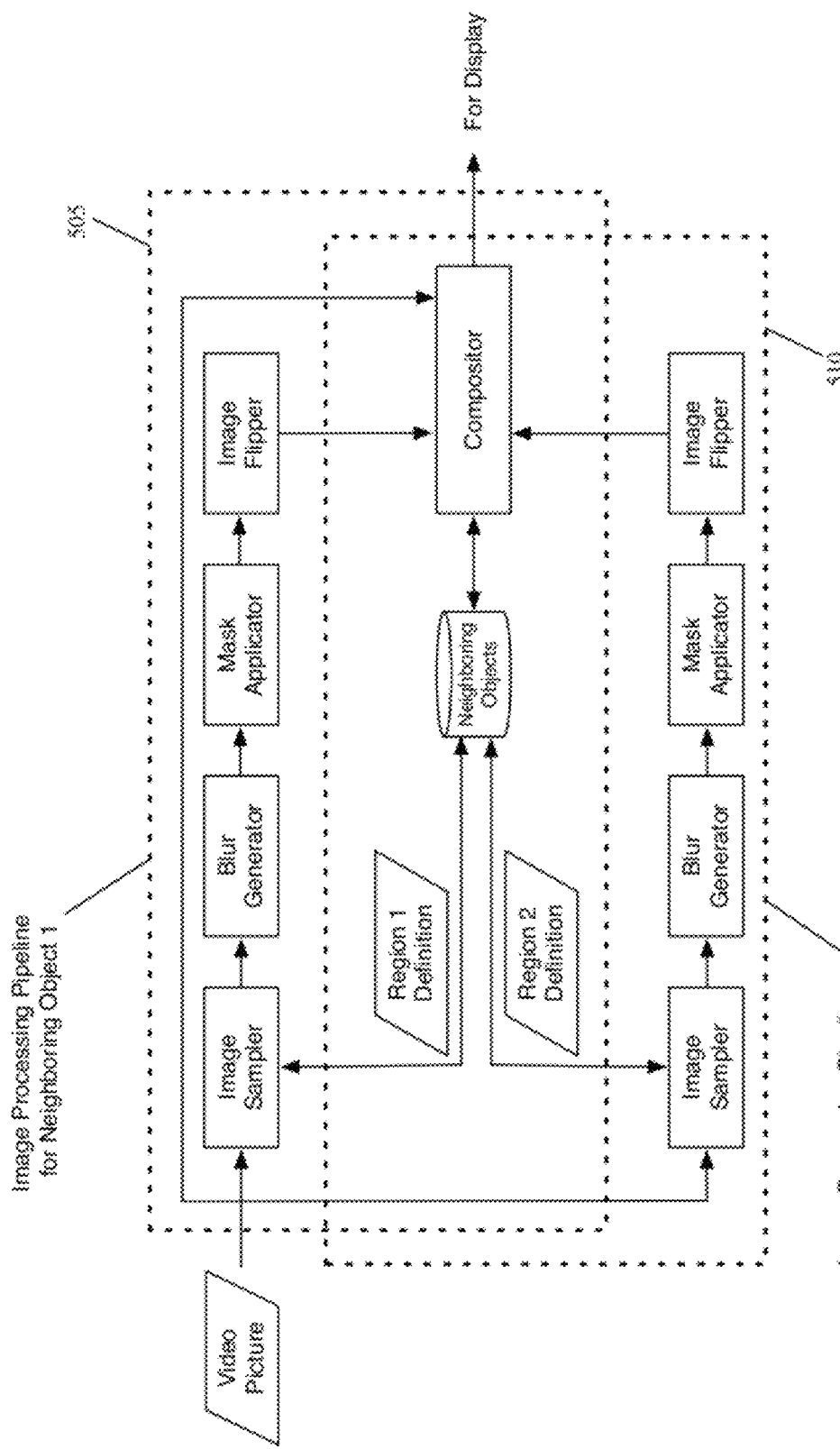
FIG. 5 illustrates two image processing pipelines with sampling of the video pictures on different region definitions.

FIG. 5 illustrates two image processing pipelines 505 and 510 that the configurator 325 defines to generate reflections on two reflective objects that are near a displayed video. Each of these pipelines 505 and 510 is identical to the pipeline 405 of FIG. 4. However, each pipeline bases its sampling of the video picture on a different region definition (i.e., on a different region of the video picture) because each reflective object has a different positional relationship with the video picture. Alternatively, both pipelines might sample the same portion of the video picture (e.g., all of the video picture) but end up cropping different portions of the sampled, blurred, and masked images to produce different reflected images to represent the different positional relationships of their corresponding objects with respect to the video picture.

To reflect such differing positional relationships, the image flipper of each pipeline might flip the output of its mask applicator along a different axis so as to properly reflect the positional relationship of the video picture to its object. Also, if the two reflective objects have different reflective properties, the sampling, blurring, and/or masking parameters of the samplers, blur generators and mask applicators in the two pipelines will differ so that the pipelines can produce different resolutions of the reflected images to represent the different reflective properties of the reflective objects.

Figure 6:
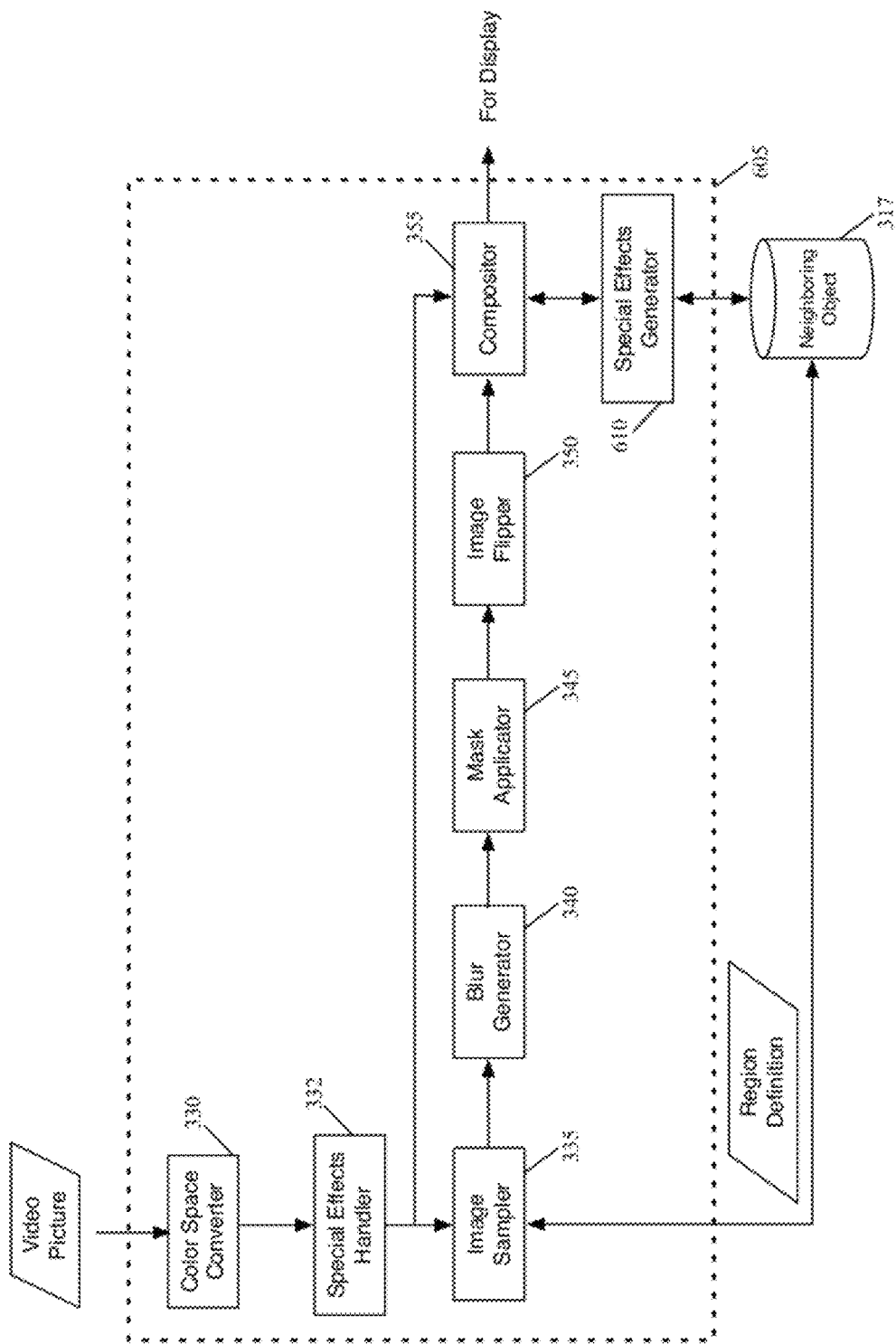
FIG. 6 illustrates another image processing pipeline, which includes a color space converter, a special effects handler and a special effects generator.

FIG. 6 illustrates another image processing pipeline 605 that the configurator 325 defines to generate reflections onto a reflective object that is near a displayed video. This pipeline 605 is identical to the pipeline 405 of FIG. 4, except that the pipeline 605 also includes a color space converter 330, a special effects handler 332 and a special effects generator 610.

The color space converter 330 of the pipeline 605 performs color space conversion on the video pictures in order to modify the color format of the video pictures if needed (e.g., from a YCbCr format into an RGB format), which the compositor 355 uses to composite several layers of the final display. The special effects handler 332 of the pipeline 605 applies one or more special effects to the captured video pictures before they are displayed when the video has to be shown with such special effects. In this pipeline, this handler also applies such effects to the copies of the video pictures that are used for generating the reflected images. As further described below by reference to FIG. 11, performing the special effects in an image processing pipeline that generates a reflection ensures that the generated reflection accounts for the application of the special effects to the video picture.

The special effects generator 610 applies one or more special effects on the reflective object for which the pipeline is generating the reflections. Such special effects are applied in some embodiments to enhance the 3D appearance of the environment. For instance, as further described below by reference to FIG. 9, the special effects in some embodiments include generating a fading pattern that darkens the edges of neighboring objects in order to simulate light shining in the center of the objects. Some embodiments do not use special effects generators to apply such special effects to the reflective objects during the runtime display of these objects. Instead, some of these embodiments generate and store the reflective objects to include such patterns so that the system 305 can use these objects at runtime.

III. Image Capturing Application

Figure 7:
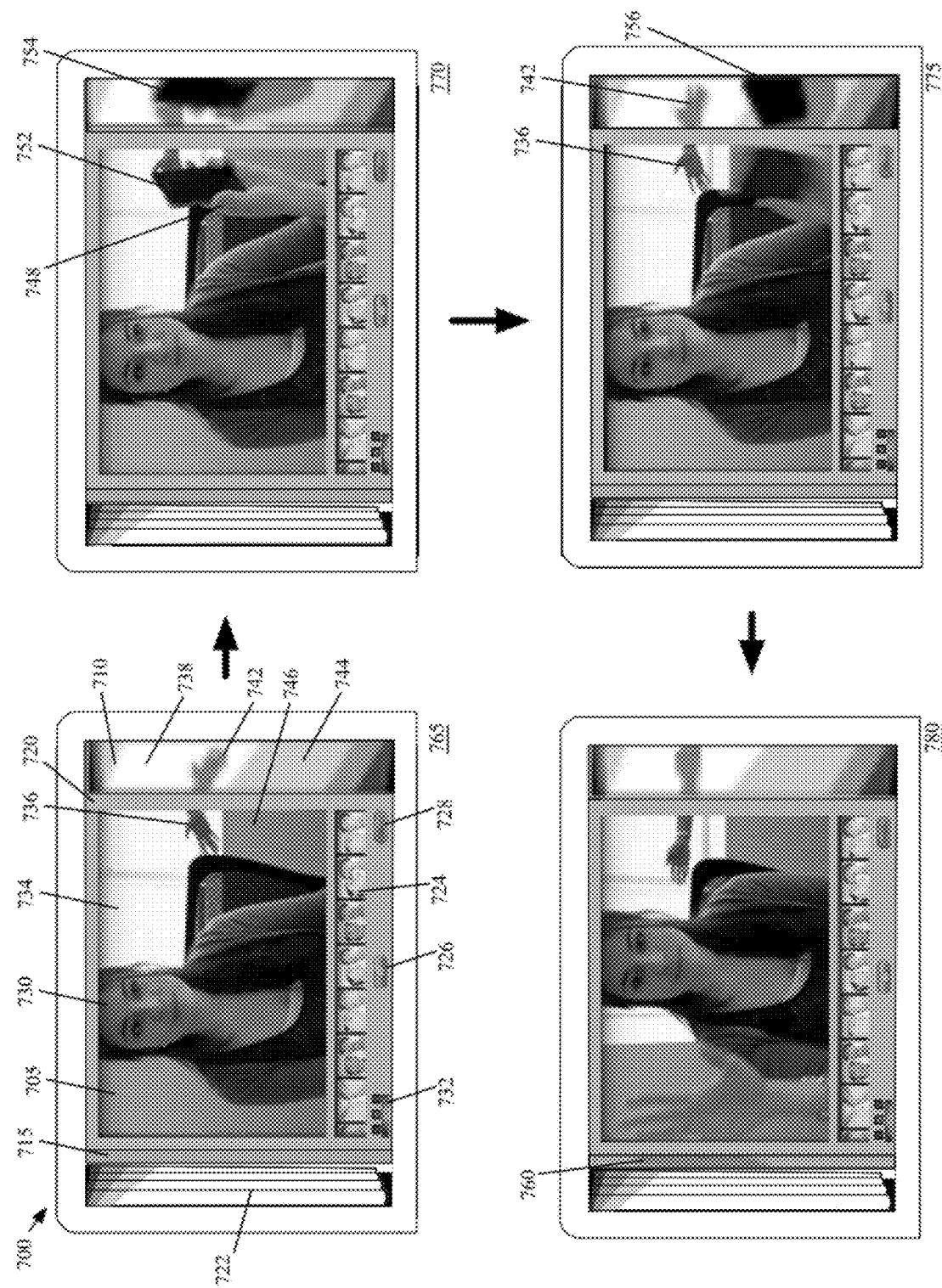
FIG. 7 illustrates an example of an image capturing application that uses the image processing system of some embodiments of the invention to generate real-time reflections.

FIG. 7 illustrates an example of an image capturing application that uses the image processing system 305 of some embodiments to generate real-time reflections for video that it captures and displays. In some embodiments, the application displays the video as it captures it, in order to allow a user to receive a preview of what an image would look like before capturing a still picture, a series of still pictures, or a video clip. The image capturing application of some embodiments executes on a device (e.g., a desktop computer, a laptop computer, a tablet computer, a multi-function mobile device, a set-top box, etc.) that includes a camera that captures the video pictures, or a device that is directly connected to this camera through one of its peripheral ports or through its network interface. This application generates real-time reflections from the content of the video that it displays in order to simulate a 3D photo booth in which a person enters to take a photo.

In some embodiments, the image capturing application has a graphical user interface (GUI) 700 that includes a display area 705 and four nearby graphical objects, which are two sidewalls 710 and 715, a bezel 720, and a curtain 722. During the image capturing session, the application displays the video that the camera captures in the display area 705. Typically, the displayed video is the video of the user that is interacting with the application, although this does not necessarily have to be the case.

Near the display area 705, the image capturing application displays the sidewalls 710 and 715, the bezel 720, and the curtain 722 that form a virtual photo booth. The bezel is flush with the display area 705 and forms one of ends of the virtual photo booth. The virtual photo booth includes four objects on the bezel 720. These four objects are an effect strip 724, a snapshot selectable item (e.g., button) 726, an effects selectable item (e.g., button) 728, and a layout item 732. The effects strip 724 displays several effects that the user can select to apply to the captured video or snapshot. The user can also select and apply these or other effects through the selectable effects item 728. The layout item 732 allows a user to modify the layout of the display area to display one, two, or more (e.g., four) versions of the same captured image.

On one or more of the neighboring objects, the application displays reflections from the content of each video frame or each of several video frames, in order to give the photo booth a 3D appearance to the viewer of the application. To project reflections from content of a video frame onto a nearby object, the image capturing application of some embodiments generates a reflection from content that is in a portion of the frame that is close to the nearby object.

In the example illustrated in FIG. 7, the application generates reflections for two of the four neighboring objects. These two objects are the sidewalls 710 and 715. The bezel 720 is not shown with any reflections because it is flush with the display area. Also, in the example illustrated in FIG. 7, no reflections are generated for the curtain 722 and the selectable items 726, 728 and 732 as these objects are assumed not to be reflective. However, in other embodiments, one or more of these objects 722, 726, 728 and 732 are treated as being reflective and hence have reflections generated for them. For example, in some embodiments, the application assumes that the curtain 722 is reflective, and that the buttons 726, 728 and 732 are reflective brass buttons. In these embodiments, the application generates reflections to project onto the curtain and these buttons.

FIG. 7 illustrates examples of reflections on the sidewalls 710 and 715 by presenting four stages 765-780 of an image capturing session. In the first stage 765, the application displays a video frame from the image capturing session. In this video frame, one of the participants 730 of the image capturing session is shown in the center of the display area 705, too far from the sidewalls 710 and 715 to cast a reflection on either of them. However, in this video frame, reflections are generated in sidewall 710 for several items in the video frame that are close to sidewall 710. These items are the window 734, a person's hand 736, and a backwall 746. On the sidewall 710, the reflections for these three items respectively are window reflection 738, hand reflection 742, and wall reflection 744.

In some embodiments, the application generates each of these reflections by (1) producing a lower resolution version of the video frame content in a portion of the video frame that it associates with the right sidewall 710, and (2) superimposing this lower resolution version onto the right sidewall 710. In some embodiments, the application uses the image processing system 305 to generate the lower resolution reflected image by performing the sampling, blurring, masking and flipping operations described above. Also, the image capturing application in some embodiments particularly defines the resolution of the reflected image for the right sidewall 710 in order to produce a reflection that matches the supposed reflective nature of the nearby object, and to produce reflections in real-time without unnecessarily consuming the computing resources of the device. These reflections on the sidewall 710 make this wall seem like it is positioned at an angle with respect to the display area 705 and thereby makes the interior of the photo booth appear as a 3D environment. This 3D appearance is also facilitated by the angled bottom of the curtain 722 and by the darkened shading at the top of this curtain.

The second stage 770 illustrates a second video frame, in which the participant 730 has moved her left hand 748 closer to the right edge of the video frame. In her left hand, the participant is holding a phone 752. With the participant's hand closer to the right sidewall 710, the image capturing application generates a reflection 754 of the participant's hand holding the phone and composites this reflection with the right sidewall 710. This is because the participant's right hand and phone are now in the portion of the video frame associated with the right sidewall 710. The application generates this reflection 754 using the same techniques that were described above for the first stage 765 reflections on the right sidewall 710.

The third stage 775 of FIG. 7 illustrates a third video frame, in which the participant 730 has started to move her hand down and away from the right edge of the video frame. At this position, the participant's image is getting farther from the right sidewall 710, hence a smaller reflection 756 of the hand and the phone are produced on the sidewall 710. The previous reflection 754 of the hand 748 in stage 770 also blocked the reflection of the hand 736 as the hand 748 blocked the hand 736 from the view in the video frame. However, in its new position in the third stage 775, the hand 748 no longer blocks the hand 736 in the video frame, hence the hand reflection 742 is once again visible.

The fourth stage 780 illustrates a fourth video frame, in which the participant 730 has moved her right hand closer to the left side of the video frame. For this position of the participant's hand, the image capturing application generates a reflection 760 on the left sidewall 715. This sidewall is smaller than the right sidewall 710. Hence, the reflection 760 appears as a narrower reflection than the reflection 754 of the left hand on the right wall 710 in the second stage 770. Given that both sidewalls are assumed to have the same reflective properties, the application generates the sidewall reflection 760 to have the same resolution as the reflections on the right sidewall.

The fourth stage also shows a reflected image on the right sidewall to conceptually represent the reflections of the window 734, the hand 736, and the back wall 746 on the right sidewall. While generating a reflection for the left sidewall 715, the application does not generate a reflection of the hand off the curtain 722 because in this example it is assumed that the curtain is not reflective. In other cases, however, the curtain could be assumed to be somewhat reflective and the application could generate a reflected image for the curtain 722 based on the content of the video frame near its left edge. Similarly, in some embodiments, the application treats the buttons 726, 728 and 732 as brass buttons, hence generates reflections for these buttons from the content of the video in the display 705. In some such embodiments, the application assumes different reflective properties for the left sidewall 715, the curtain 722, and the buttons 726, 728 and 732, and therefore specifies different sampling, blurring, and/or masking parameters for image processing pipelines that respectively generate the reflected images for these objects.

The image capturing application of some embodiments illustrates reflections with a screen blend mode that shows the highlights of the reflections and not their shadows. This prevents dark pixels in the reflected images from darkening all or part of a reflective object beyond recognition. As mentioned above, some embodiments eliminate such dark pixels from the reflected images by eliminating them during the compositing operation.

The real-time generation of all the reflections in the first, second, third and fourth stages 765, 770, 775, and 780 respectively reinforces the 3D sensation of the photo booth. This is because they allow the participant to see real-time reflections of themselves as they move about. Such reflections are often instinctively associated with live 3D settings. Therefore, viewing such reflections give the participant the sensation of being in a 3D environment.

The image capturing application in some embodiments generates each of the sidewalls by using two masks that are applied on top of each other. One contains the woodgrain and is tileable. The second one is stretchable and masks the first mask. Building the woodgrain into the mask makes the reflection more realistic because the woodgrain picks up the hills and valleys from the wood texture.

Figure 8:
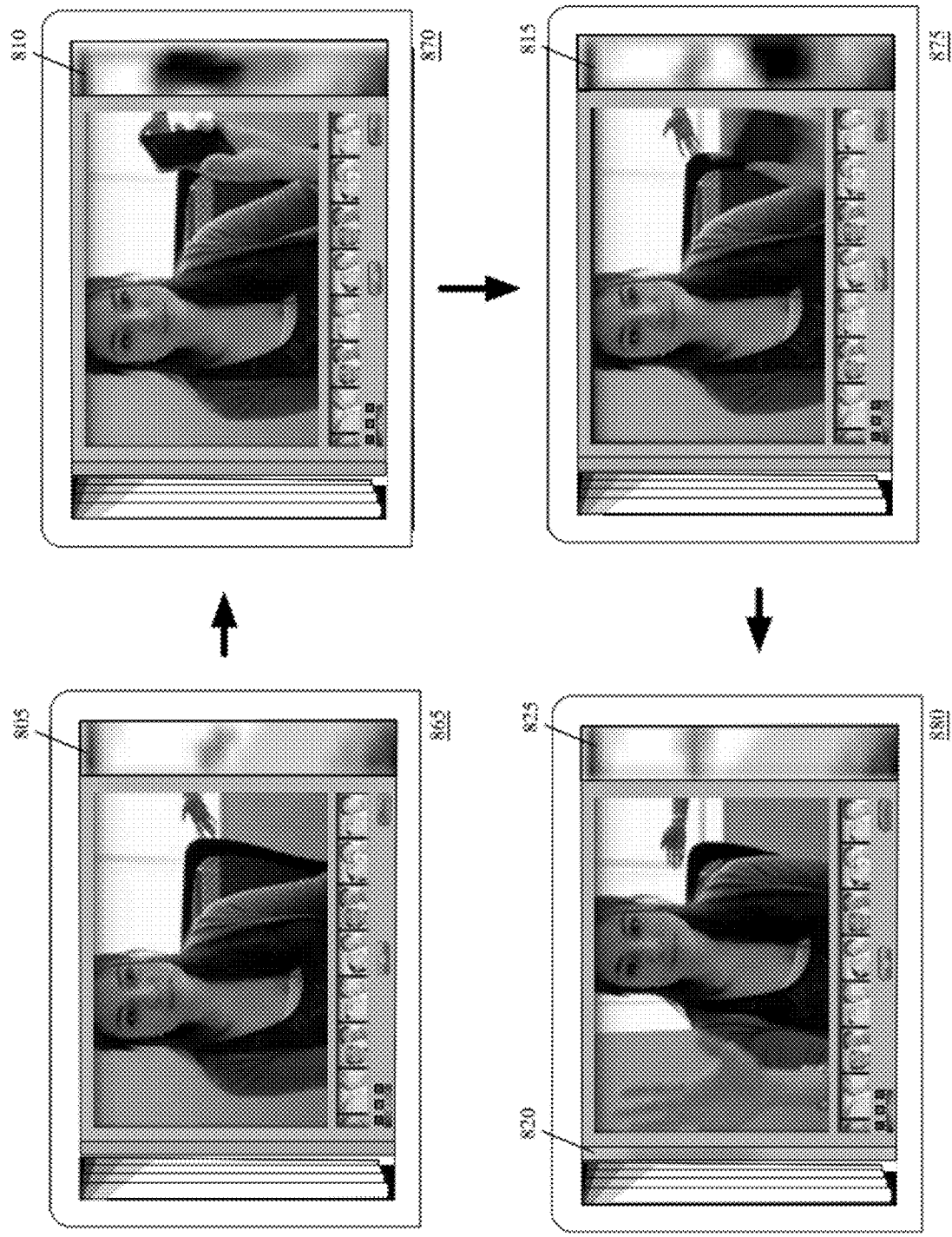
FIG. 8 illustrates another example of an image capturing session of the image capturing application of some embodiments.

FIG. 8 illustrates another example of an image capturing session of the image capturing application of some embodiments. This example is identical to the example illustrated in FIG. 7 except that in FIG. 8 the right and left sidewalls 710 and 715 are assumed to have lower reflective properties. Accordingly, in FIG. 8, the reflections 805, 810, 815, 820, and 825 that are displayed in the first-fourth stages 865–880 have lower resolutions than the reflections displayed in the first-fourth stages of FIG. 7. Such lower reflective properties are assumed in some embodiments to better represent the reflective properties of walls in a photo booth. Alternatively, in other embodiments, such lower reflective properties are specified in order to reduce the computational resources that are needed by the operations (e.g., the sampling, blurring, and masking operations) that are needed to produce the reflections. As mentioned above, exact replication of the reflections is not needed in some embodiments because the 3D sensation can often be created by producing limited amount of reflections in real-time.

Figure 9:
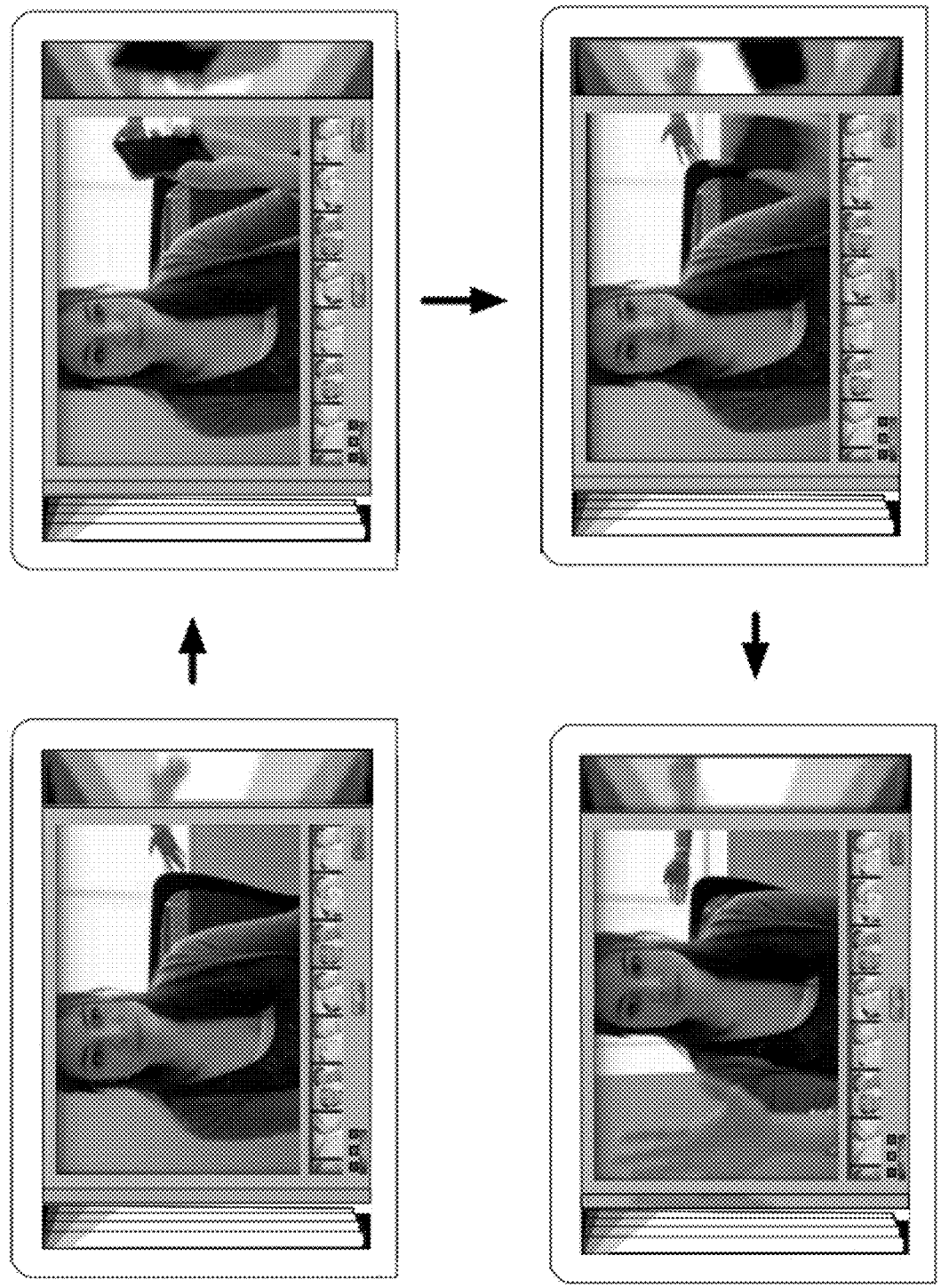
FIG. 9 illustrates additional examples of an image capturing session of the image capturing application of some embodiments.

FIG. 9 illustrates yet another example of an image capturing session of the image capturing application of some embodiments. This example is also identical to the example illustrated in FIG. 7 except that in FIG. 9 the right sidewall 710 becomes darker towards its top and bottom. This darkened appearance of the sidewall along its top and bottom edges reinforces the 3D appearance of the photo booth.

Figure 10:
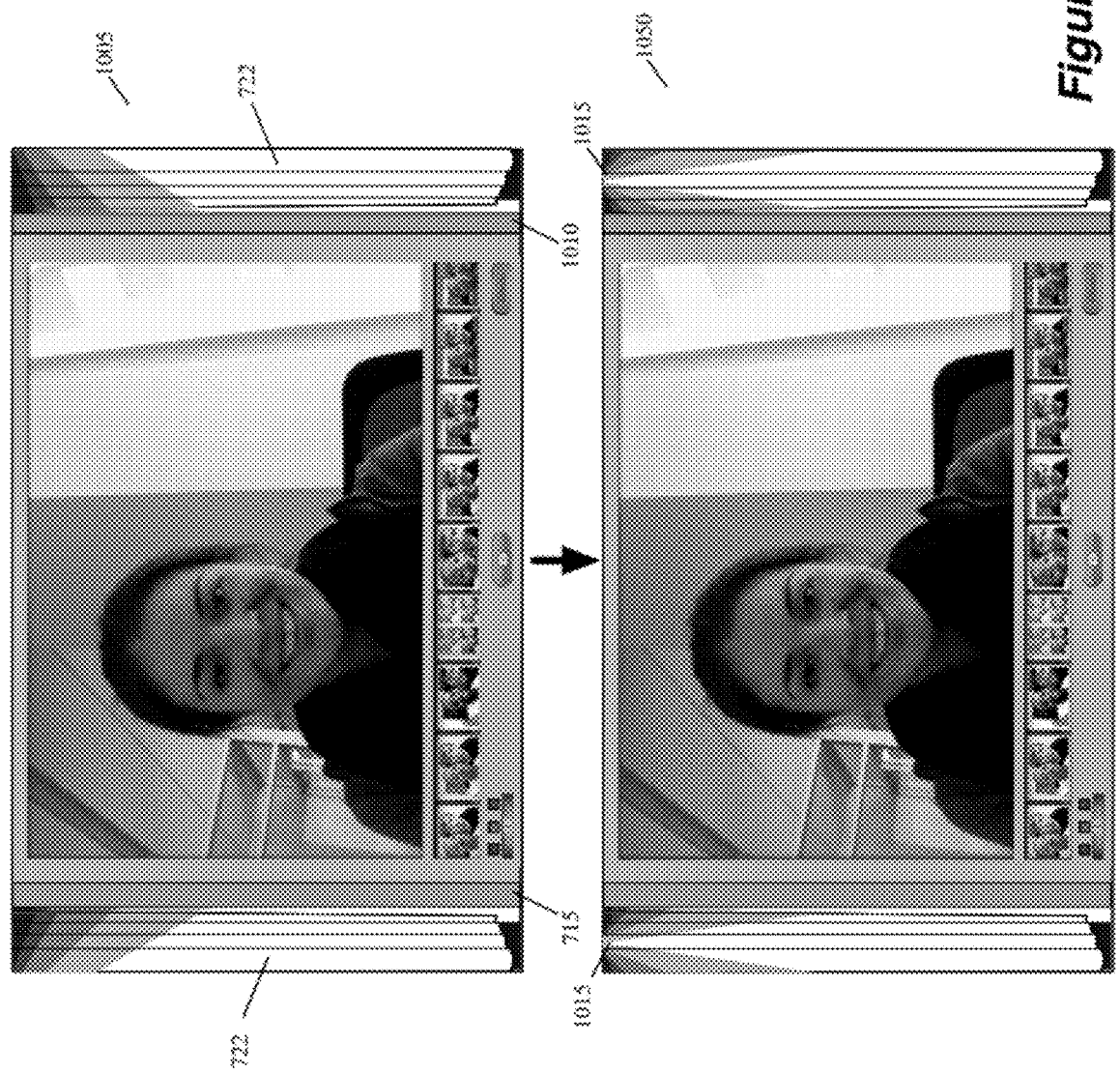
FIG. 10 another example of an image capturing session of the image capturing application of some embodiments.

FIG. 10 illustrates another layout of the photo booth that is used by some embodiments of the invention. This layout is similar to the photo booth layout in FIG. 7, except that the curtains 722 appear on the both right and left sides of the photo booth and because of this, the right sidewall 1010 appears as narrow as the left sidewall 715. The photo booth layout of FIG. 10 also uses two simulated light sources to accentuate its photo booth feel. Specifically, when a user initially starts the image capturing application, the user is presented with a photo booth display 1005 that displays no light source above the right and left curtains 722. However, after a few seconds (e.g., three seconds), the application displays a new photo booth display 1050 that is similar to the previous display 1005, except that in the display 1050 a lighting effect 1015 displayed above each curtain 722. This lighting effect is intended to make the user feel as if he or she has entered the photo both and is now ready to take a picture, a series of pictures, or a video.

Figure 11:
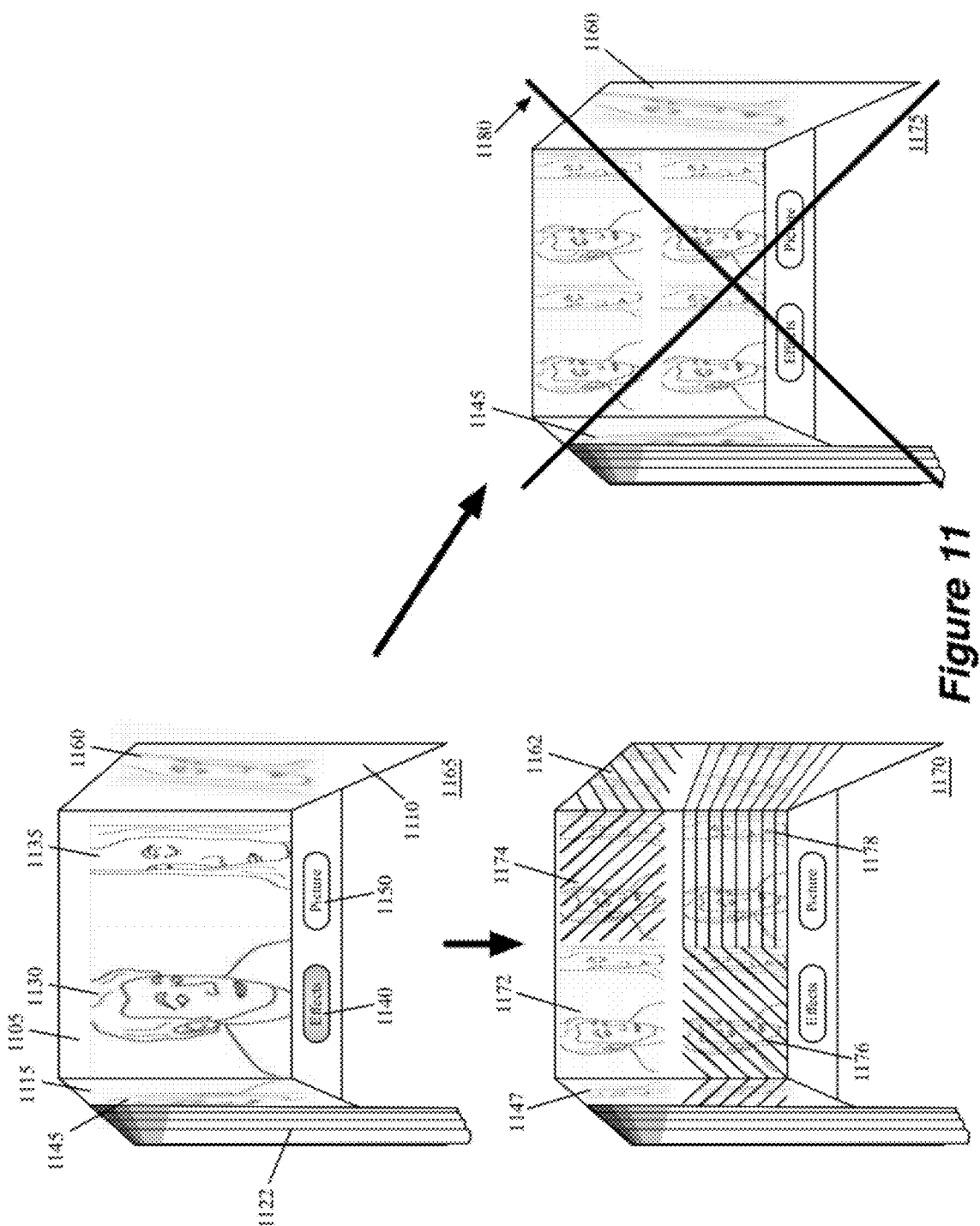
FIG. 11 illustrates how in some embodiments the image capturing application accounts for special effects in generating reflections.

FIG. 11 illustrates another example of an image capturing session of the image capturing application of some embodiments. This example illustrates how in some embodiments the image capturing application accounts for special effects that it applies to the captured, displayed video pictures in generating reflections from these video pictures. FIG. 11 illustrates this example in two stages 1165 and 1170. The first stage 1165 shows that initially the image capturing application displays the images of two participants 1130 and 1135 on its display area 1105. It further shows that for this display the application has generated two reflections 1145 and 1160 and has projected these two reflections onto the left and right sidewalls 1115 and 1110. This stage 1165 also illustrates the highlighting of an effects button 1140 to illustrate that a user is about to select this button in order to apply an effect to the display of the two participants 1130 and 1135. Another button illustrated in this stage is the picture button 1150, which directs the application to record a still picture.

The second stage 1170 shows the image capturing application after this application has applied an effect to the display of the two participants 1130 and 1135. This effect replaces the single display of the two participants with four versions 1172, 1174, 1176, and 1178 of these two participants, with each version having a different color cast effect applied to it. The second stage 1170 also shows that the application accounts for this effect in the reflections that it generates of the four displays. Specifically, the generated reflection 1162 on the right sidewall shows the reflection of the two rightmost versions 1174 and 1178 within the display area 1105, as these two versions 1174 and 1178 appear closest to the right sidewall 1110. Similarly, the generated reflection 1147 on the left sidewall 1115 shows a partial reflection of the two leftmost versions 1172 and 1176 within the display area 1105 as these two versions appear closest to the left sidewall. This reflection on the left sidewall is a partial reflection as part of this reflection is supposedly blocked out by the curtain 1122.

Instead of generating the reflections displayed in the second stage 1170, the image capturing application could have generated the reflections displayed in a third stage 1175. This stage 1175 illustrates a case where the application generates reflections off the original images of the participants 1130 and 1135 instead of generating these reflections off the versions 1172, 1174, 1176, and 1178 of these participants. Accordingly, in this stage, the generated reflections on the left and right sidewalls are identical to the reflections on the left and right sidewalls in first stage 1165.

The image capturing application of some embodiments, however, does not generate the reflections 1145 and 1160 (as indicated by the cross out 1180) because such reflections are incongruous with the video pictures that are presented in the display area 1105. Such incongruity diminishes the 3D sensation as it does not mimic the reflections that would be produced in the real world. Because of this incongruity, the image capturing application of some embodiments applies any special effects that are applied to the original video picture, to the reflection of the video picture that the application uses to sample, blur, mask, and/or flip.

In the examples illustrated in FIGS. 7-10, the image capturing application displays its GUI on one display device. Accordingly, in these examples, the display area for displaying the captured video, and the nearby graphical objects (e.g., the sidewalls) for reflecting the video, are all shown on one display device. However, one of ordinary skill in the art will realize that when the image capturing application executes on a device with more than one display screen (e.g., executes on a computer that has and/or uses more than one display screen), the image capturing application can allow the video to be displayed on one display screen while displaying the neighboring objects and the reflections off the neighboring objects on one or more other display screens.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage that can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more electronic systems, define one or more specific machine implementations that execute and perform the operations of the software programs.

Figure 12:
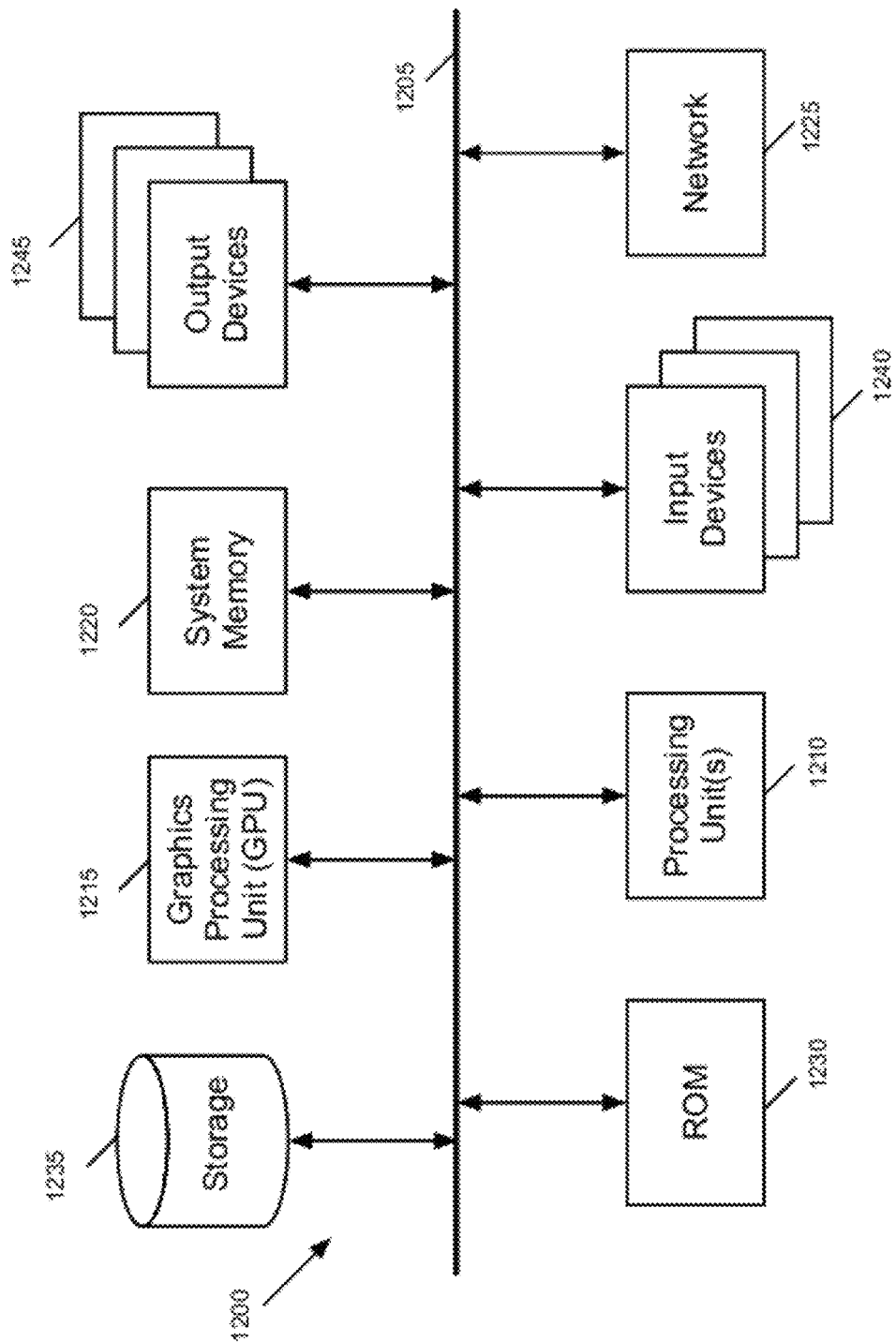
FIG. 12 conceptually illustrates an electronic system with which some embodiments of the invention are implemented.

FIG. 12 conceptually illustrates an electronic system with which some embodiments of the invention are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 may include, but is not limited to a bus 1205, a processing unit(s)1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieve instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by processing unit(s) 1210. In some embodiments, such functionality can be provided using CoreImage's kernel shading language.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1220, the permanent storage device 1235, and/or the read-only memory 1230. For example, the various memory units include instructions for processing images in accordance with some embodiments. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In addition, several operations (e.g., those illustrated in FIG. 2) were conceptually illustrated as being part of a single process or sequence of operations. One of ordinary skill will realize that some embodiments may not perform these operations in the exact order shown and described above. These operations may be performed in different order or different series of operations.

While the invention has been described with reference to numerous specific details, one of ordinary skill in the art will recognize that the invention can be embodied in other specific forms without departing from the spirit of the invention. For instance, while several embodiments were described above by reference to applications that execute on a device, one of ordinary skill will realize that image capturing applications and/or modules in some embodiments are part of the operating system of the device. Thus, one of ordinary skill in the art would understand that the invention is not to be limited by the foregoing illustrative details, but rather is to be defined by the appended claims.

We claim:

1. A method of displaying an image, the method comprising:
   receiving an image for display in an image window on a display;
   estimating reflection properties of an object in the display neighboring the image window,
   generating reflection content from the image according to a technique determined from the estimated reflection properties of the neighboring object;
   adding the reflection content to content of the neighboring object; and
   displaying the image and the neighboring object with the added reflection content in the display.

2. The method of claim 1 further comprising:
   capturing the image;
   displaying the image in real-time upon capturing of the image;
   wherein the generating reflection content comprises generating the reflection content in real-time and the displaying of the reflection content occurs concurrently with the display of the captured image.

3. The method of claim 1, wherein the image is a video picture, said capturing the image comprising capturing a stream of video pictures.

4. The method of claim 1 further comprising identifying a portion of the image corresponding to a display area occupied by the neighboring object and generating the reflection content based on said identified portion.

5. The method of claim 4, wherein generating the reflection content based on the identified portion comprises cropping the reflection content to account for the identified portion.

6. The method of claim 1, wherein the technique comprises sampling the image at a sampling rate determined by the reflection properties of the neighboring object.

7. The method of claim 4, wherein the portion is part of the captured image that is to be placed adjacent to the neighboring object.

8. The method of claim 1,
   wherein the captured image has a plurality of pixels;
   wherein generating the reflection comprises selecting a subset of the pixels from the captured image.

9. The method of claim 1, wherein the technique comprises blurring content of the image using blurring parameters determined by the reflection properties of the neighboring object.

10. The method of claim 9, wherein generating the reflection further comprises flipping the blurred content about an axis that is defined based on a boundary between the displayed image and neighboring object, in order to cause the reflection to appear as a mirror inverted copy of the content in the received image.

11. The method of claim 9,
    wherein the received image has a plurality of pixels having a plurality of pixel values;
    wherein blurring the image content comprises replacing pixel values of each set of neighboring pixel values with one pixel value.

12. The method of claim 11, wherein the replacing comprises averaging the pixel values of each set of neighboring pixels and assigning an average value for each set of neighboring pixels to the pixels in the set.

13. The method of claim 9,
    wherein the received image has a plurality of pixels having a plurality of pixel values;
    wherein blurring the image content comprises replacing the set of pixel values of each particular pixel with a set of pixel values derived from pixels values of a set of pixels that are near the particular pixel.

14. A non-transitory computer readable medium storing a program for displaying video pictures, the program comprising sets of instructions for:
selecting video pictures captured by a camera;
displaying the captured video pictures in an image window of a display;
estimating reflection properties of an object to be displayed in an object region neighboring the image window;
generating reflection content for the neighboring object from content of the image according to a technique determined by the estimated reflection properties;
adding the reflection content to an image of the neighboring object as it is displayed in the object region.

15. The non-transitory computer readable medium of claim 14, wherein the set of instructions for generating reflection content comprises sets of instructions for:
identifying a portion of the video picture corresponding to the neighboring object; and
generating the reflection based on said identified portion.

16. The non-transitory computer readable medium of claim 15, wherein the set of instructions for generating reflection content comprises a set of instructions for cropping the reflection content to account for the identified portion.

17. The non-transitory computer readable medium of claim 15, wherein the set of instructions for generating reflection content comprises a set of instructions for sampling the video picture at a sampling rate determined by the reflection properties of the neighboring object.

18. The non-transitory computer readable medium of claim 15, wherein the portion is part of the captured video picture that is to be placed adjacent to the neighboring object.

19. The non-transitory computer readable medium of claim 14,
wherein each video picture has a plurality of pixels;
wherein the set of instructions for generating the reflection comprises a set of instructions for selecting a subset of the pixels from the captured video picture.

20. The non-transitory computer readable medium of claim 14, wherein the set of instructions for generating reflection content comprises a set of instructions for blurring content using blurring parameters determined by the reflection properties of the neighboring object.

21. The non-transitory computer readable medium of claim 20, wherein the set of instructions for generating reflection content further comprises a set of instructions for flipping the blurred content about an axis that is defined based on a boundary between the displayed, captured video picture and the neighboring object, in order to cause the reflection content to appear as a mirror inverted copy of the image content in the video picture.

22. An image processor for execution on an electronic device, the image processor comprising
a reflection generator for:
estimating reflection properties of an object to be displayed neighboring to an image window having image content,
generating a reflection content for the object based on the image content according to a technique determined from the estimated reflection properties of the neighboring object;
a compositor for adding the reflection content to content of the neighboring object that is displayed adjacent to the image window.

23. The image processor of claim 22 further comprising:
an image capture module for capturing the image;
the reflection generator for generating the reflection in real-time so that the reflection content is added to the neighboring object and displayed concurrently with the display of the captured image.

24. The image processor of claim 22 further comprising an identifier for identifying a portion of the image corresponding to the neighboring object and generating the reflection content based on said identified portion.

25. The image processor of claim 24, wherein the reflection generator comprises an image cropper for cropping the generated reflection content based on the identified portion.

26. The image processor of claim 24, wherein the reflection generator comprises an image sampler that samples the image at a sampling rate determined by the reflection properties of the neighboring object.

27. The image processor of claim 24, wherein the portion is part of the captured image that is to be placed adjacent to the neighboring object.

28. The image processor of claim 22,
wherein the captured image has a plurality of pixels;
wherein the reflection generator comprises an image sampler for selecting a subset of the pixels from the captured image in order to generate the reflection content.

29. The image processor of claim 28, wherein the reflection generator further comprises a blur generator for blurring pixel values using blurring parameters determined by the reflection properties of the neighboring object.

30. The image processor of claim 29, wherein the reflection generator further comprises an image flipper for flipping the blurred pixel values about an axis that is defined based on a boundary between the captured image and neighboring object, in order to cause the reflection content to appear as a mirror inverted copy of the image content in the portion.

31. The method of claim 1, wherein the neighboring object is a foreground object in the display, and the display includes background content for which no reflection content is presented.

32. The method of claim 1, wherein the neighboring object is a structure of a user interface element that includes the image window.

33. The method of claim 1, wherein the generating reflection content skips processing of portions of the image that have brightness levels below a predetermined threshold.

34. The image processor of claim 22, wherein the image is a video picture, and the image capture module is for capturing a stream of video pictures.

* * * * *